United States Patent
Kim et al.

(10) Patent No.: US 10,054,677 B2
(45) Date of Patent: Aug. 21, 2018

(54) BEAMFORMING APPARATUS, BEAMFORMING METHOD, AND ULTRASONIC IMAGING APPARATUS

(71) Applicant: SAMSUNG ELECTRONICS CO., LTD., Suwon-si (KR)

(72) Inventors: Kyuhong Kim, Seoul (KR); Baehyung Kim, Yongin-si (KR); Suhyun Park, Hwaseong-si (KR); Jong Keun Song, Yongin-si (KR); Kyungil Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 473 days.

(21) Appl. No.: 14/740,535

(22) Filed: Jun. 16, 2015

(65) Prior Publication Data
US 2016/0019881 A1    Jan. 21, 2016

(30) Foreign Application Priority Data
Jul. 16, 2014 (KR) .................. 10-2014-0089496

(51) Int. Cl.
*G01S 7/52* (2006.01)
*G10K 11/34* (2006.01)

(52) U.S. Cl.
CPC ........ *G01S 7/52023* (2013.01); *G01S 7/5208* (2013.01); *G01S 7/52025* (2013.01); *G01S 7/52047* (2013.01); *G10K 11/346* (2013.01)

(58) Field of Classification Search
CPC ........ A61B 8/06; A61B 8/488; G01S 15/8979; G01S 7/52066
See application file for complete search history.

(56) References Cited

U.S. PATENT DOCUMENTS

2005/0080329 A1\* 4/2005 Uchibori .............. A61B 8/06
                                                            600/407

\* cited by examiner

*Primary Examiner* — Luke D Ratcliffe
(74) *Attorney, Agent, or Firm* — Sughrue Mion, PLLC

(57) ABSTRACT

A beamforming apparatus includes: a signal output unit configured to output signals; a time difference corrector configured to correct a time difference between the signals; and a weight applier configured to apply a weight value to the signals, according to an error between the signals with the corrected time difference and a target delay pattern.

18 Claims, 26 Drawing Sheets

FIG. 11
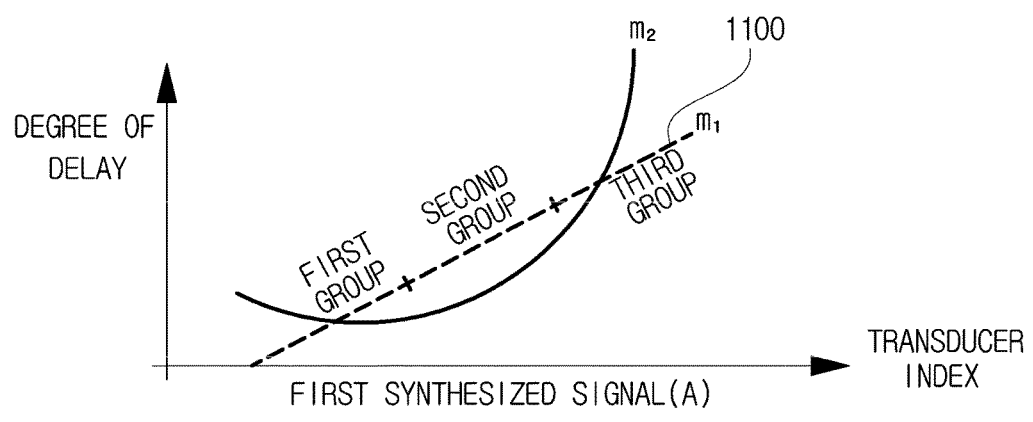
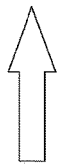
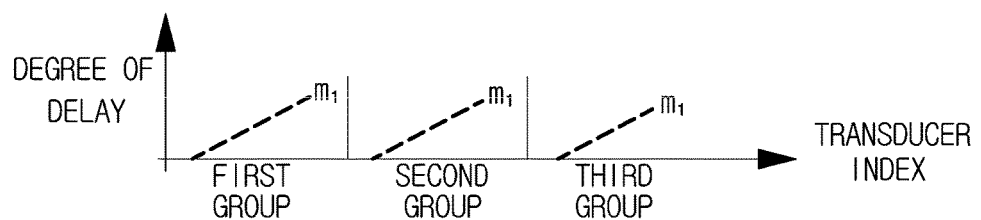

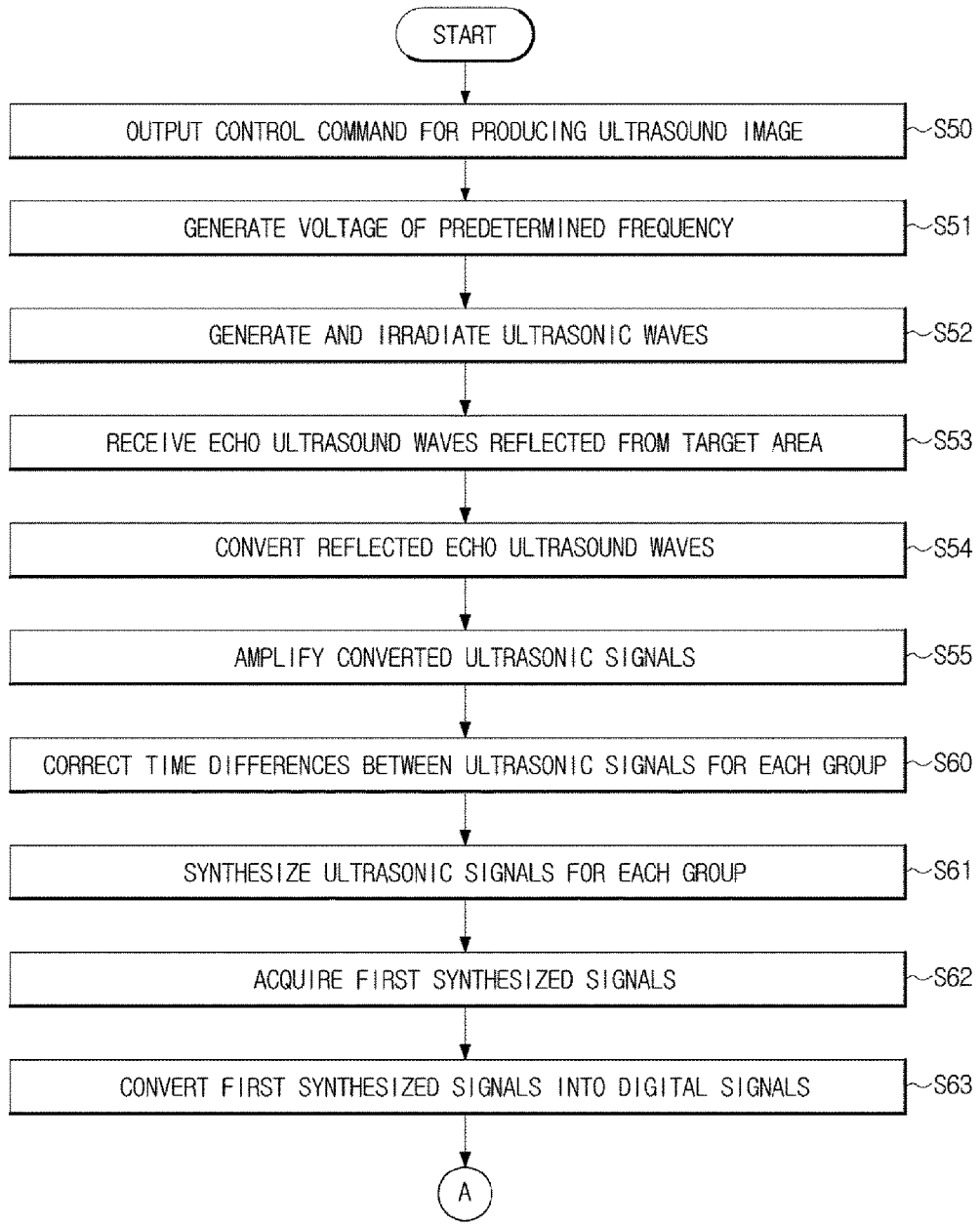

BEAMFORMING APPARATUS, BEAMFORMING METHOD, AND ULTRASONIC IMAGING APPARATUS

CROSS-REFERENCE TO RELATED APPLICATION

This application claims priority from Korean Patent Application No. 10-2014-0089496, filed on Jul. 16, 2014, in the Korean Intellectual Property Office, the disclosure of which is incorporated herein by reference in its entirety.

BACKGROUND

1. Field

Apparatuses and methods consistent with exemplary embodiments relate to beamforming in an ultrasonic imaging apparatus.

2. Description of the Related Art

Beamforming is a process of synthesizing electrical signals of multiple channels to generate a signal in an ultrasonic imaging apparatus or a radar apparatus. The beamforming can be used to produce an image based on signals of multiple channels.

For example, an ultrasonic imaging apparatus beamforms ultrasonic signals of multiple channels corresponding to received ultrasonic waves to acquire an image that is suitable to diagnose an object. In this case, the ultrasonic imaging apparatus converts ultrasonic waves received by individual transducers into ultrasonic signals of multiple channels that are electrical signals, corrects time differences between the ultrasonic signals of multiple channels, applies specific weights to the ultrasonic signals of the respective channels, and synthesizes the ultrasonic signals, thereby performing beamforming.

SUMMARY

One or more exemplary embodiments provide a beamforming apparatus, a beamforming method, and an ultrasonic imaging apparatus, capable of synthesizing a plurality of signals while minimizing deterioration of picture quality to acquire a high-quality image.

Additional aspects of the disclosure will be set forth in part in the description which follows and, in part, will be obvious from the description, or may be learned by practice of the exemplary embodiments.

In accordance with an aspect of an exemplary embodiment, a beamforming apparatus includes: a signal output unit configured to output one or more signals; a time difference corrector configured to correct a time difference between the signals such that the signals form a predetermined pattern; and a weight applying unit configured to apply a weight value to the signals, according to an error between the signals with the corrected time difference and the predetermined pattern.

The one or more signals may be grouped into a plurality of groups.

The time difference corrector may correct the time difference between the signals such that each group forms a pattern.

The time difference corrector may correct the time difference between the signals such that the signals form a predetermined gradation.

The weight applying unit may synthesize the signals to which the weight value has been applied.

The weight applying unit may apply a weight value that is inverse-proportional to the error, to the signals.

The beamforming apparatus may further include an analog-to-digital converter configured to convert, if the signals are analog signals, the signals into digital signals.

The weight value applying unit may include: a weight processor configured to calculate a weight value according to the error between the signals with the corrected time difference and the predetermined pattern; and a synthesizer configured to apply the calculated weight value to the signals, and to synthesize one or more signals.

The beamforming apparatus may further include a first synthesizer configured to synthesize the signals with the corrected time difference, wherein the weight applying unit may include a second synthesizer configured to synthesize the signals to which the weight value has been applied.

The beamforming apparatus may further include a storage unit configured to store the predetermined pattern.

In accordance with an aspect of another exemplary embodiment, a beamforming method includes: outputting one or more signals; correcting a time difference between the signals such that the signals form a predetermined pattern; and applying a weight value to the signals according to an error between the signals with the corrected time difference and the predetermined pattern.

The one or more signals may be grouped into a plurality of groups.

The correcting of the time difference between the signals may include correcting the time difference between the signals such that each group forms a pattern.

The correcting of the time difference between the signals may include correcting the time difference between the signals such that the signals form a predetermined gradation.

The applying of the weight value to the signals may include synthesizing the signals to which the weight value has been applied.

The applying of the weight value to the signals may include applying a weight value that is inverse-proportional to the error, to the signals.

The applying of the weight value to the signals may include: calculating a weight value according to the error between the signals with the corrected time difference and the predetermined pattern; and applying the calculated weight value to the signals to synthesize one or more signals.

In accordance with an aspect of an exemplary embodiment, an ultrasonic imaging apparatus includes: an ultrasound transducer configured to receive ultrasonic waves, to convert the ultrasonic waves into one or more electrical signals, and to output one or more ultrasonic signals; a first beamformer configured to synthesize the ultrasonic signals such that the ultrasonic signals form a predetermined pattern, and to generate one or more first synthesized signals; and a second beamformer configured to apply a weight value to the first synthesized signals according to an error between the first synthesized signals and the predetermined pattern, to synthesize the first synthesized signals to which the weight value has been applied, and to generate a second synthesized signal.

The first beamformer may include a first time difference corrector configured to correct a time difference between the ultrasonic signals such that the ultrasonic signals form a predetermined pattern.

The ultrasonic imaging apparatus may further include at least one of: a converter configured to convert, if the first synthesized signals are analog signals, the first synthesized signals into digital signals; a signal processor configured to perform signal-processing on the second synthesized signal by performing at least one of filtering, demodulation, and compression on the second synthesized signal, and to output the signal-processed signal; and an image processor configured to convert the signal-processed signal into an ultrasound image, and to perform image-processing on the ultrasound image.

BRIEF DESCRIPTION OF THE DRAWINGS

The above and/or other aspects will become more apparent by describing certain exemplary embodiments with reference to the accompanying drawings, in which:

FIG. 11 shows graphs showing the results of applying a weight by a second weight processor;

FIGS. 21A and 21B are flowcharts illustrating a control method of an ultrasonic imaging apparatus, according to an exemplary embodiment.

DETAILED DESCRIPTION

Certain exemplary embodiments are described in greater detail below with reference to the accompanying drawings.

Hereinafter, a beamforming apparatus according to an exemplary embodiment will be described with reference to FIGS. 1 to 8.

Figure 1:
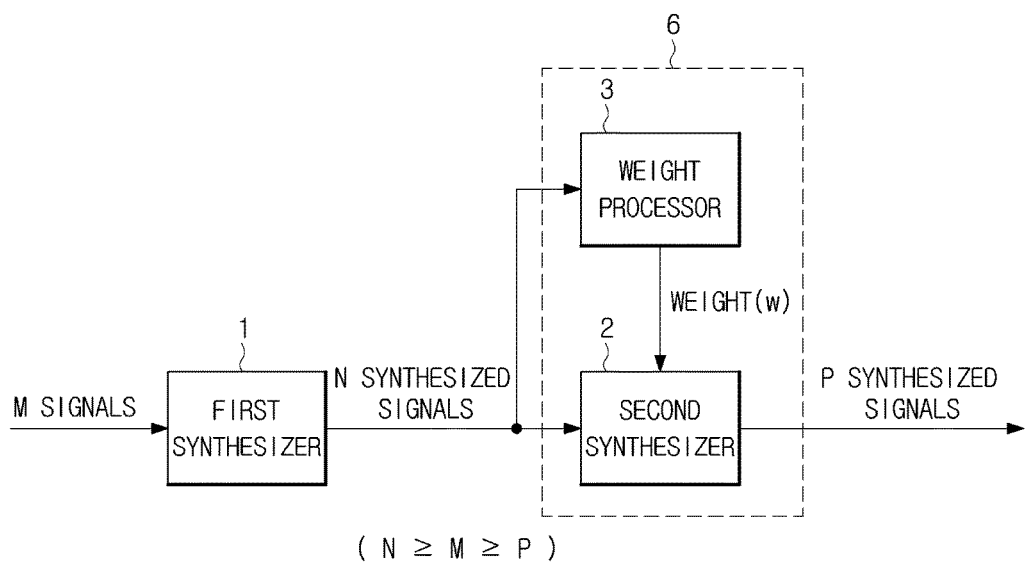
FIG. 1 is a block diagram of a beamforming apparatus according to an exemplary embodiment.

FIG. 1 is a block diagram of a beamforming apparatus according to an exemplary embodiment. As shown in FIG. 1, the beamforming apparatus may include a first synthesizer 1 to synthesize a plurality of input signals and to output a plurality of first synthesized signals, and a weight applier 6 including a second synthesizer 2 and a weight processor 3. The second synthesizer 2 synthesizes the first synthesized signals using one or more weight values w and outputs at least one second synthesized signal. The weight processor 3 calculates the weight values w that are used by the second synthesizer 2 based on the first synthesized signals. The first synthesized signals that are used by the weight processor 3 to calculate the weight values w may depend on the input signals or a synthesis process of the first synthesizer 1. Accordingly, the weight values w that are calculated by the weight processor 3 may also depend on the input signals or the synthesis process of the first synthesizer 1.

Hereinafter, for convenience of description, the number of the input signals that are input to the first synthesizer 1 is assumed to be M, and the number of the first synthesized signals that are synthesized by the first synthesizer 1 and transferred to the second synthesizer 2 is assumed to be N. Also, the number of the second synthesized signals that are output from the second synthesizer 2 is assumed to be P. Herein, M, N, and P may be natural numbers, wherein M and P may be 1. In other words, the number of signal channels may be reduced by the first synthesizer 1, and then reduced by the second synthesizer 2. In other words, the second synthesizer 2 may synthesize the N synthesized signals to output a synthesized signal.

Figure 2:
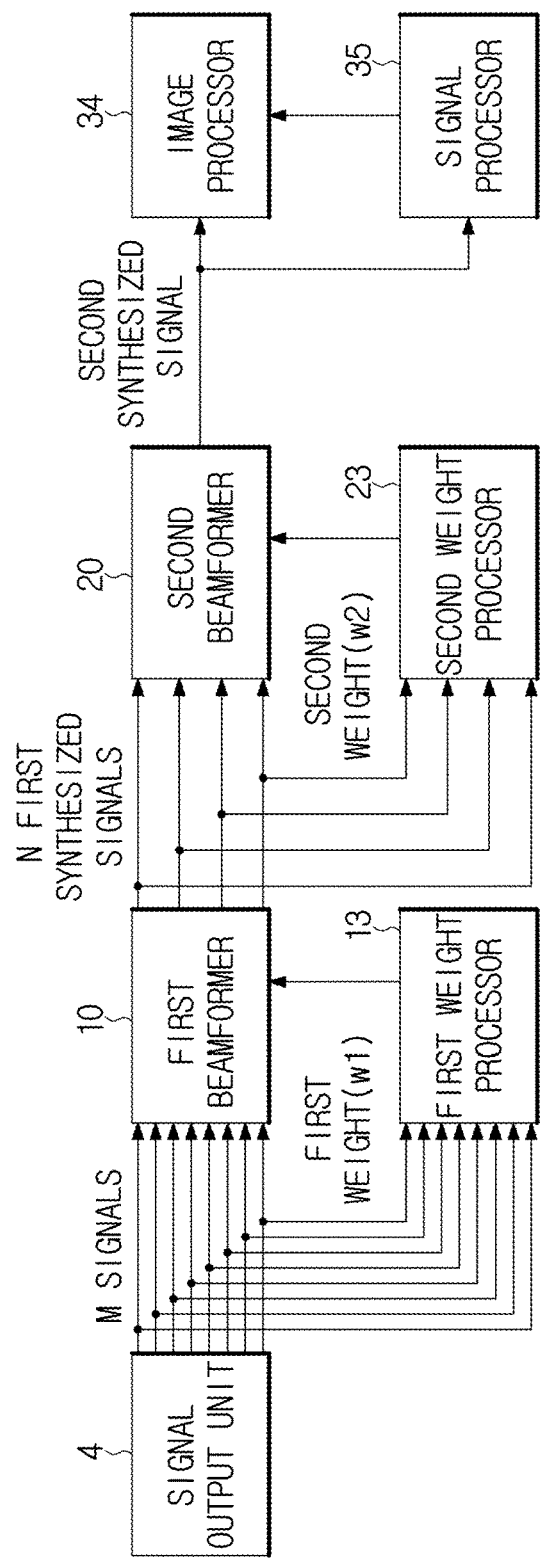
FIG. 2 is a block diagram illustrating a detailed configuration of a beamforming apparatus according to an exemplary embodiment.

FIG. 2 is a block diagram illustrating a detailed configuration of a beamforming apparatus according to an exemplary embodiment. Referring to FIG. 2, the beamforming apparatus may include a signal output unit 4, a first beamformer 10, a second beamformer 20, and a second weight processor 23. Also, according to an exemplary embodiment, the beamforming apparatus may further include a first weight processor 13.

The signal output unit 4 may output signals of multiple channels. The signals may be analog signals or digital signals. The signal output unit 4 may be an ultrasound receiver such as an ultrasound transducer to receive ultrasonic waves and to output electrical signals corresponding to the received ultrasonic waves. Also, the signal output unit 4 may be an electromagnetic wave receiver to receive electromagnetic waves such as microwaves and to output electrical signals corresponding to the received electromagnetic waves. The signals of multiple channels may be transferred to the first beamformer 10. According to an exemplary embodiment, the signals of multiple channels may be transferred to both the first beamformer 10 and the first weight processor 13.

Figure 3:
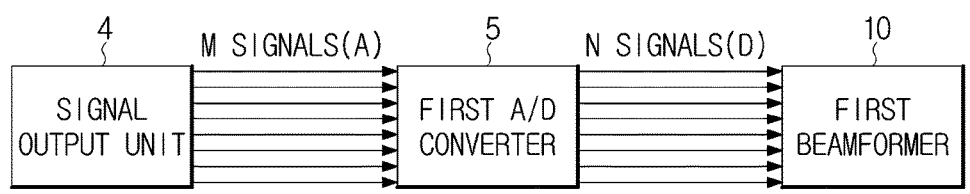
FIG. 3 is a view for describing a beamforming apparatus, according to an exemplary embodiment.

FIG. 3 is a view for describing a beamforming apparatus with a first analog-to-digital converter, according to an exemplary embodiment. As shown in FIG. 3, a first analog-to-digital (A/D) converter 5 for converting an analog signal into a digital signal may be disposed between the signal output unit 4 and the first beamformer 10. The first analog-to-digital converter 5 may convert an analog signal output from the signal output unit 4 into a digital signal. Accordingly, the first beamformer 10 may process an analog signal output from the signal output unit 4, in a digital fashion. The first analog-to-digital converter 5 may convert input analog signals of M channels into digital signals of M channels. The first analog-to-digital converter 5 may convert the analog signals into the digital signals using a rate of sampling set arbitrarily by a system designer or a user of the beamforming apparatus. However, the first analog-to-digital converter 5 may be omitted.

If needed, the signals of multiple channels output from the signal output unit 4 may be amplified by an amplifier (not shown), and transferred to the first analog-to-digital converter 5 or the first beamformer 10. The amplifier may increase a magnitude of a voltage to convert a magnitude of a signal that is transferred to the first beamformer 10 into a magnitude that is suitable to be processed and stored. A gain of the amplifier may be arbitrarily set by the system designer or the user of the beamforming apparatus. However, the amplifier may be omitted depending on an embodiment.

Figure 4:
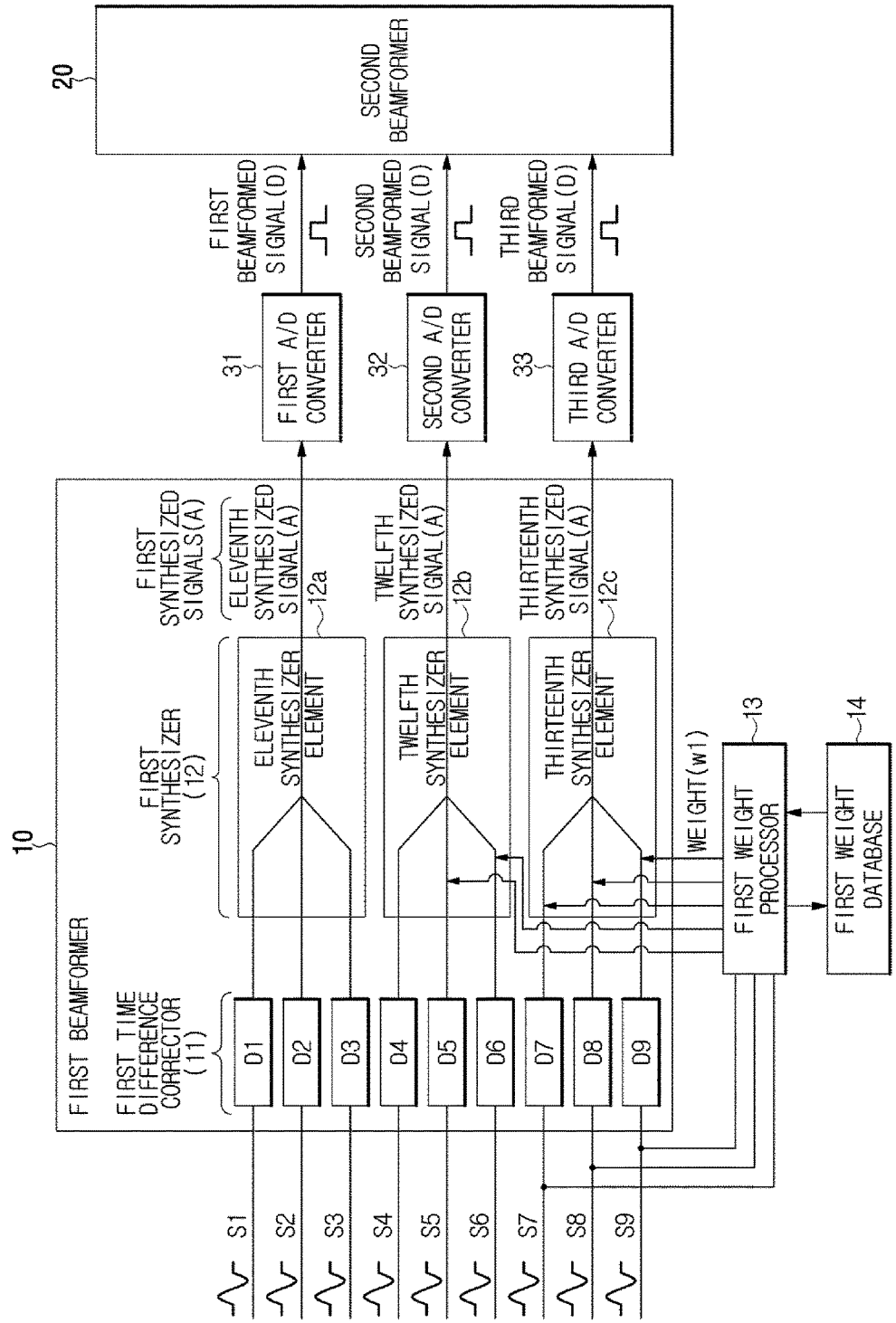
FIG. 4 is a view for describing a first beamformer of a beamforming apparatus, according to an exemplary embodiment.

FIG. 4 is a view for describing the first beamformer 10 of the beamforming apparatus, according to an exemplary embodiment. As shown in FIG. 4, the first beamformer 10 may include a first time difference corrector 11 and a first synthesizer 12. Input signals S1, S2, S3, S4, S5, S6, S7, S8, and S9 of multiple channels that are input to the first beamformer 10 may be grouped into at least one group according to predetermined criteria. In the following description, for convenience of description, it is assumed that the signals S1 to S9 of multiple channels are grouped into a plurality of groups according to the first synthesizer 12 by which the signals S1 to S9 of the individual channels are synthesized. For example, as shown in FIG. 4, the signals S1 to S9 of multiple channels may be grouped into a plurality of groups in such a manner that the first to third signals S1 to S3 that are synthesized by an eleventh synthesizer element 12*a* form a first group, the fourth to sixth signals S4 to S6 that are synthesized by a twelfth synthesizer element 12*b* form a second group, and the seventh to ninth signals S7 to S9 that are synthesized by a thirteenth synthesizer element 12*c* form a third group. However, at least one of the plurality of groups may include a signal of the same channel in common. For example, a part of signals that are input to the first beamformer 10 may be included in both the first and second groups. However, the plurality of groups may be disjoints. In other words, the respective groups may include signals of different channels, as shown in FIG. 4. Signals of each group may be subject to time difference correction with respect to each other, or may be synthesized by the corresponding synthesizer element 12*a* to 12*c*.

The first time difference corrector 11 may correct time differences between the signals of multiple channels output from the signal output unit 4. The signals of multiple channels may be analog signals or digital signals. As shown in FIG. 4, the first time difference corrector 11 may include a plurality of time difference correcting devices (that is, eleventh to nineteenth time difference correcting devices D1, D2, D3, D4, D5, D6, D7, D8, and D9) corresponding to the respective channels. The time difference correcting devices D1 to D9 may be implemented as a predetermined semiconductor chip or circuit. The time difference correcting devices D1 to D9 may or may not delay the signals of the respective channels corresponding to the time difference correcting devices D1 to D9 by a predetermined time period, thereby correcting channel delay values between the signals of the respective channels.

Figure 5:
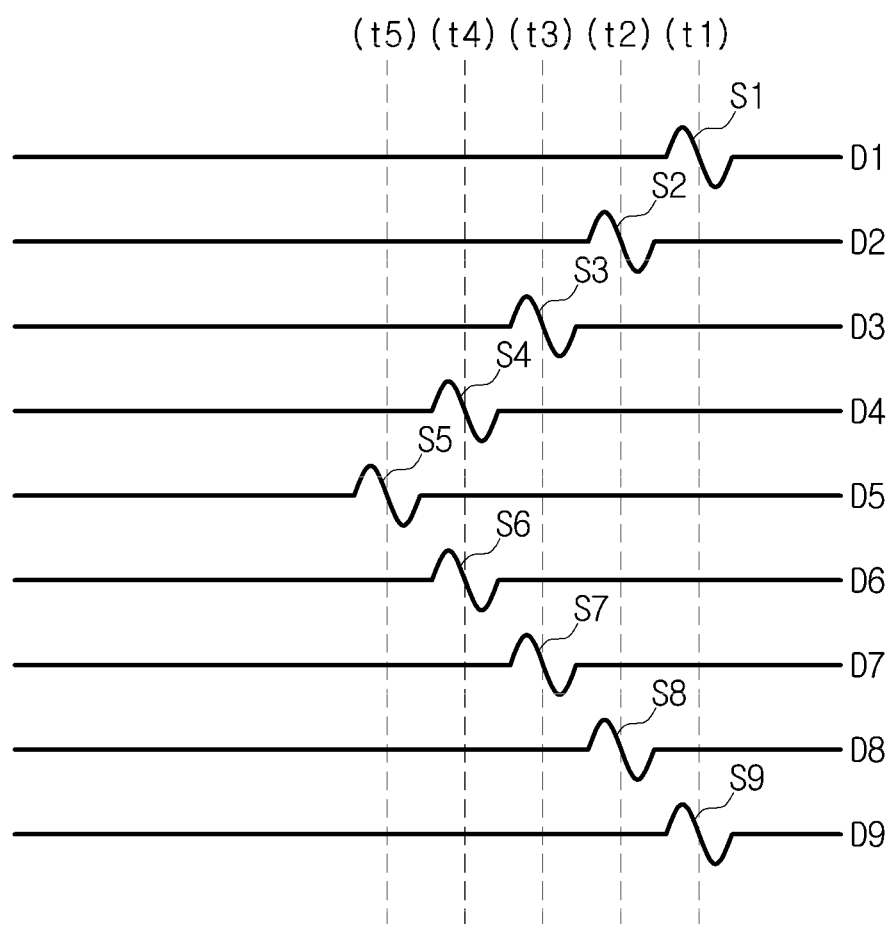
FIGS. 5 and 6 are views for describing a time delay process that is performed by a first beamformer, according to an exemplary embodiment.
Figure 6:
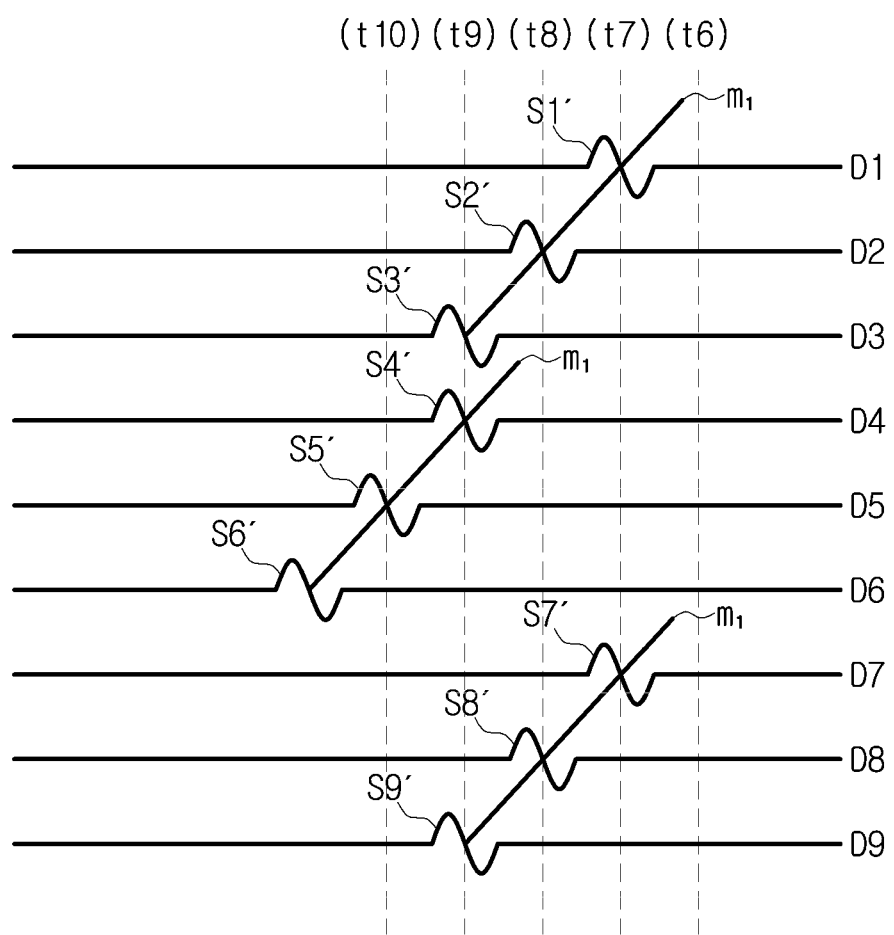

FIGS. 5 and 6 are views for describing a time delay process that is performed by the first beamformer 10, according to an exemplary embodiment. As shown in FIGS. 5 and 6, the time difference correcting devices D1 to D9 may be set to correct time differences between signals of the same group. For example, as shown in FIG. 5, the first to third signals S1 to S3 corresponding to the first group may be sequentially input to the eleventh to thirteenth time difference correcting devices D1 to D3, respectively. In this case, since the first to third signals S1 to S3 are input to the eleventh to thirteenth time difference correcting devices D1 to D3 at different times t1 to t3, time differences between the first to third signals S1 to S3 may be generated. As shown in FIG. 6, the eleventh to thirteenth time difference correcting devices D1 to D3 may delay the first to third signals S1 to S3, respectively, to correct the time differences between the first to third signals S1 to S3 such that the first to third signals S1 to S3 form a delay pattern with a predetermined gradient $m_1$, and may output the first to third signals S1', S2, and S3' with the corrected time differences. Likewise, the fourth to sixth signals S4 to S6 corresponding to the second group may be input to the fourteenth to sixteenth time difference correcting devices D4 to D6 at different times t4 and t5 with predetermined time differences. As shown in FIG. 6, the fourteenth to sixteenth time difference correcting devices D4 to D6 may delay the fourth to sixth signals S4 to S6 to correct the time differences between the fourth to sixth signals S4 to S6 such that the fourth to sixth signals S4 to S6 form a delay pattern with the predetermined gradient $m_1$. Likewise, the seventh to ninth signals S7 to S9 corresponding to the third group input to the seventeenth to nineteenth time difference correcting devices D7 to D9 at different times t1 to t3 may be corrected by the seventeenth to nineteenth time difference correcting devices D7 to D9, respectively, such that the seventh to ninth signals S7 to S9 form a delay pattern with the predetermined gradient $m_1$.

That is, the time difference correcting devices D1 to D9 may correct time differences between signals of each group such that the signals of the group form a delay pattern with a predetermined gradient $m_1$.

The predetermined gradient $m_1$ may include an elevation direction gradient and a lateral direction gradient. The predetermined gradient $m_1$ may be set or stored in advance regardless of the input signals S1 to S9, or the predetermined gradient $m_1$ may vary depending on the input signals S1 to S9.

Time differences between signals (for example, S1 to S3) corresponding to the same group may be corrected, while time differences between signals corresponding to different groups may not be corrected. For example, as shown in FIG. 6, the signals S1' to S3' of the first group may be output at a time t8, while signals s4' to s6' of the second group may be output at a time t10. In this case, a time difference still exists between the first group and the second group. However, some groups, such as the first group and the third group, which output signals at the time t8 may have no time difference.

Referring again to FIG. 4, the first synthesizer 12 may synthesize the signals between which time differences have been corrected by the first time difference corrector 11 to generate a plurality of first synthesized signals, for example, eleventh to thirteenth synthesized signals. Herein, the signals synthesized by the first synthesizer 12 may be analog signals or digital signals. The first synthesizer 12 may include a plurality of synthesizers, for example, eleventh to thirteenth synthesizer elements 12*a* to 12*c*, as shown in FIG. 4. The individual synthesizer elements 12*a* to 12*c* may synthesize signals of predetermined channels among the signals of multiple channels. As shown in FIG. 4, the respective synthesizer elements 12*a* to 12*c* may synthesize signals of the corresponding groups to output a plurality of first synthesized signals A. For example, the eleventh synthesizer element 12*a* may synthesize the signals S1 to S3 of the first group to output an eleventh synthesized signal, and the twelfth synthesizer element 12*b* may synthesize the signals S4 to S6 of the second group to output a twelfth synthesized signal. Also, the thirteenth synthesizer element 12c may synthesize the signals S7 to S9 of the third group to output a thirteenth synthesized signal.

Figure 7:
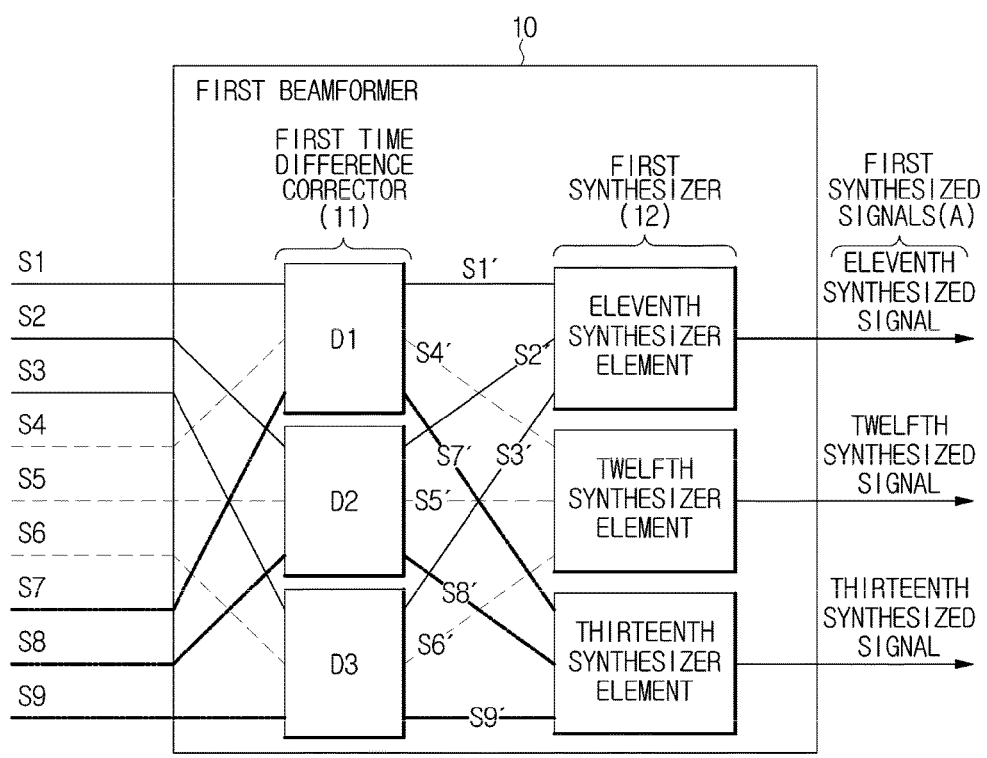
FIG. 7 is a view for describing a first beamformer of a beamforming apparatus, according to an exemplary embodiment.

FIG. 7 is a view for describing the first beamformer 10 of the beamforming apparatus, according to another exemplary embodiment. According to an exemplary embodiment, the first time difference corrector 11 may include the eleventh to thirteenth time difference correcting devices D1 to D3, instead of the eleventh to nineteenth time difference correcting devices D1 to D9, and the groups of the input signals S1 to S9 share the time difference correcting devices D1 to D3. More specifically, the eleventh to thirteenth difference correcting devices D1 to D3 may correct time differences between the first to ninth signals S1 to S9 such that the first to third signals S1 to S3, the fourth to sixth signals S4 to S6, and the seventh to ninth signals S7 to S9 form a delay pattern with the predetermined gradient $m_1$. That is, the eleventh to thirteenth difference correcting devices D1 to D3 may be shared by the individual groups of input signals to correct time differences such that each group of input signals forms a delay pattern with the predetermined gradient $m_1$.

As shown in FIG. 7, the eleventh synthesizer 12 may synthesize the signals S1' to S3' of the first group between which time differences have been corrected by the eleventh to thirteenth time difference correcting devices D1 to D3, to generate an eleventh synthesized signal, and the twelfth synthesizer 12 may synthesize the signals S4' to S6' of the second group between which time differences have been corrected by the eleventh to thirteenth time difference correcting devices D1 to D3, to generate a twelfth synthesized signal. Also, the thirteenth synthesizer 12 may synthesize the signals S7' to S9' of the third group between which time differences have been corrected by the eleventh to thirteenth time difference correcting devices D1 to D3, to generate a thirteenth synthesized signal. At this time, the respective time difference correcting devices D1 to D3 may delay signals based on the predetermined gradient $m_1$ to correct time differences between the signals so that a plurality of synthesizers, for example, the eleventh to thirteenth synthesizer elements 12a to 12c can synthesize appropriate signals. The eleventh to thirteenth time difference correcting devices D1 to D3 may correct the time differences of the signals of the different groups such that the signals of the different groups, for example, the signals S1 to S3 of the first group and the signals S4 to S6 of the second group can be output at the same time.

As shown in FIGS. 2 and 4, at least one of the eleventh to thirteenth synthesizer elements 12a to 12c may apply one or more first weight values w1 to synthesize the signals S1 to S9 of the individual groups. The first weight values w1 may be applied to at least one of the signals S1 to s9 of the individual groups to enhance, weaken, or remove a specific signal. According to an exemplary embodiment, all of the eleventh to thirteenth synthesizer elements 12a to 12c may apply the first weight values w1 to synthesize the signals S1 to S9 of the individual groups. According to another exemplary embodiment, only a predetermined synthesizer, for example, only the thirteenth synthesizer element 12c may apply the first weight values w1 to synthesize the individual signals S7 to S9. The first weight values w1 may have been set regardless of the input signals S1 to S9, or may vary depending on the input signals S1 to S9.

The first weight processor 13 may determine the first weight values w1, and transfer the first weight values w1 to the first synthesizer 12. The first weight processor 13 may access a first weight database 14 to read the predetermined first weight values w1 from the first weight database 14, and transfer the read first weight values w1 to the first synthesizer 12. Also, the first weight processor 13 may receive, as shown in FIG. 4, at least one signal among the input signals S1 to S9, read a predetermined weight calculation method from the first weight database 14, and determine the first weight values w1 based on the received signal and the predetermined weight calculation method.

According to an exemplary embodiment, the first weight processor 13 may calculate errors of the signals S1' to S9' with the corrected time differences, output from the first time difference corrector 11, and determine weight values that are inverse-proportional to the values of the errors, as the first weight values w1.

Figure 8:
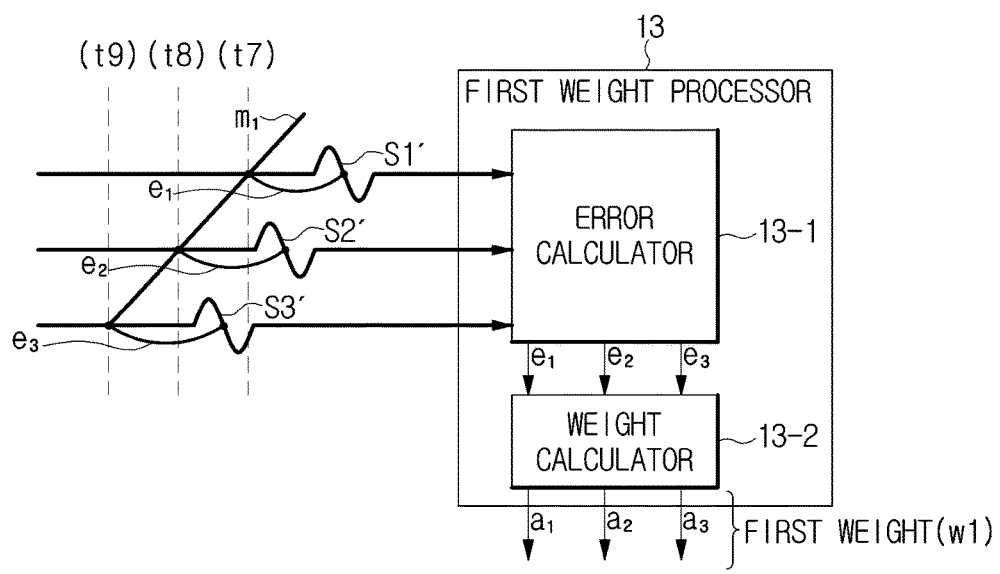
FIG. 8 is a control block diagram of a first weight processor.

FIG. 8 is a control block diagram of the first weight processor 13.

Referring to FIG. 8, the first weight processor 13 may include an error calculator 13-1 to calculate errors of the signals S1' to S9' with the corrected time differences, and a weight calculator 13-2 to determine weight values $a_1$ to $a_{10}$ of the signals S1' to S9' with the corrected time differences.

For example, the signals S1' to S3' with the corrected time differences of the first group may include errors $e_1$ to $e_3$, although the signals S1' to S3' have been corrected by the time difference corrector 13 such that signals S1' to S3' form a delay pattern with the predetermined gradient $m_1$.

The error calculator 13-1 may calculate the errors $e_1$ to $e_3$ of the signals S1' to S3' with the corrected time differences, and output the errors $e_1$ to $e_3$ to the weight calculator 13-2.

The weight calculator 13-2 may calculate first weight values $a_1$ to $a_3$ of the signals S1' to S3' with the corrected time differences, based on the errors $e_1$ to $e_3$ received from the error calculator 13-2. More specifically, the weight calculators 13-2 may calculate first weight values $a_1$ to $a_3$ that are inverse-proportional to the received errors $e_1$ to $e_3$. For calculating the first weight values $a_1$ to $a_3$ that are inverse-proportional to the received errors $e_1$ to $e_3$, the weight calculator 13-2 may apply the inverse values of the errors $e_1$ to $e_3$ to the signals S1' to S3' with the corrected time differences. Referring to FIG. 8, since the signal S1' includes the error $e_1$, the weight calculator 13-2 may apply a weight value $1/e_1$ to the signal S1'. Likewise, the weight calculator 13-2 may apply a weight value $1/e_2$ to the signal S2', and apply a weight value $1/e_3$ to the signal S3'.

The first weight processor 13 may transfer, as shown in FIG. 4, the weight values w1 only to a part of the synthesizer elements 12a to 12c, for example, only to the thirteenth synthesizer element 12c. However, the first weight processor 13 or the first weight database 14 may be omitted.

As described above, the first beamformer 10 may output a plurality of first synthesized signals A based on input signals of multiple channels. The beamforming process that is performed by the first beamformer 10 may be expressed as Equation (1), below.

$$z_{jk}(t) = \sum_{i=1}^{K_j} a_i x_i(t - \Delta_{ik}(t)) \quad (1)$$

In Equation (1), i and j are positive integers, $z_{jk}(t)$ is a first synthesized signal A of a j-th group of input signals, i is an index representing a channel of each signal of the j-th group, and $K_j$ is the number of the channels of input signals of the j-th group. $K_j$ may satisfy Equation (2) below.

$$M = \sum_{j=1}^{J} K_j \qquad (2)$$

In Equation (2), M is the total number of channels that are finally synthesized through the first beamformer 10 and the second beamformer 20, and J is the number of groups of input signals.

In Equation (1), $a_i$ is a first weight value that is applied to each channel, $\Delta_{ik}(t)$ is a time difference correction value that is used for time difference correction by the first time difference corrector 11, and $x_i(t-\Delta_{ik}(t))$ is a signal subject to time difference correction by the first time difference corrector 11.

Signals output from the first synthesizer 12 may be directly transferred to the second beamformer 20. According to an exemplary embodiment, signals output from the first synthesizer 12 may be transferred to the second beamformer 20 via the second analog-to digital converters 31, 32, and 33.

According to an exemplary embodiment, as shown in FIG. 4, the beamforming apparatus may further include the second analog-to-digital converters 31 to 33 to convert the first synthesized signals A (for example, the eleventh to thirteenth synthesized signals) that are analog signals output from the first beamformer 10, into digital signals. The second analog-to-digital converters 31 to 33 may convert the eleventh to thirteenth synthesized signals into digital signals so that the second beamformer 20 can process the eleventh to thirteenth synthesized signals in a digital fashion. The second analog-to-digital converters 31 to 33 may convert analog signals into digital signals using a sampling rate that is arbitrarily set by a system designer or a user of the beamforming apparatus.

Figure 9:
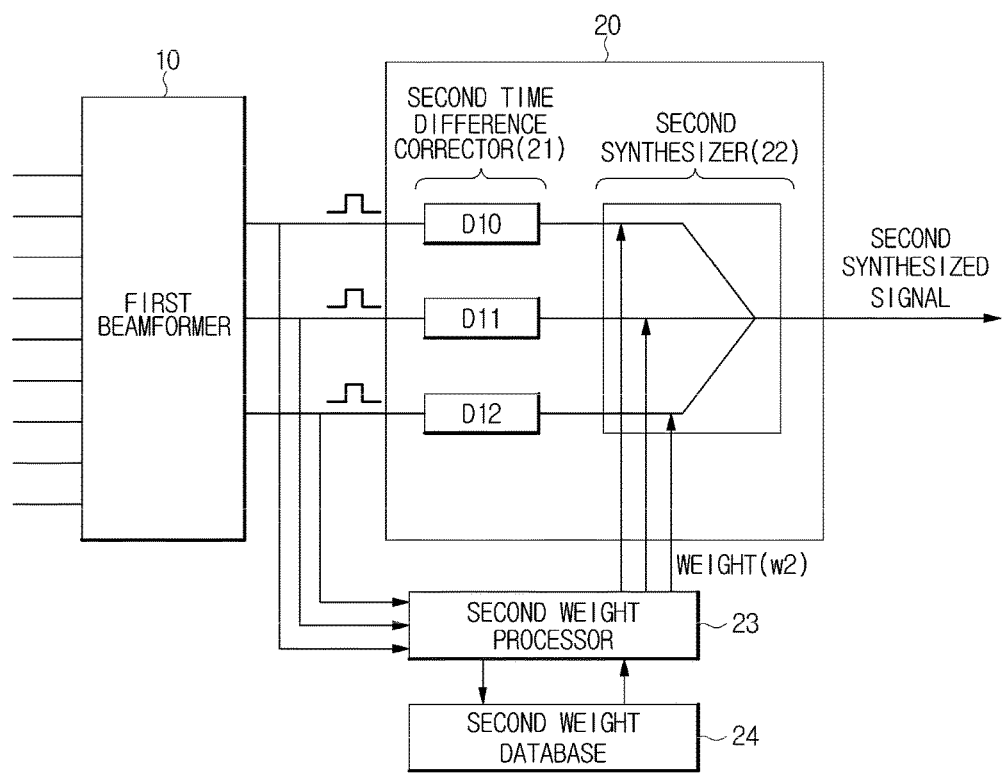
FIG. 9 is a view for describing a second beamformer of a beamforming apparatus, according to an exemplary embodiment.

FIG. 9 is a view for describing the second beamformer 20 of the beamforming apparatus, according to an exemplary embodiment. Referring to FIG. 9, the second beamformer 20 may include a second time difference corrector 21 and a second synthesizer 22.

The second time difference corrector 21 may correct time differences between the first synthesized signals A. As shown in FIG. 6, since time differences exist between signals of different groups, time differences may still exist between the first synthesized signals A acquired by synthesizing the signals of the different groups. The second time difference corrector 21 may correct the time differences between the first synthesized signals A, and transfer the first synthesized signals A with the corrected time differences to the second synthesizer 22. For example, the second time difference corrector 21 may correct, similar to the first time difference corrector 11, the first synthesized signals A such that the first synthesized signals A form a delay pattern with a predetermined gradient $m_2$.

The second synthesizer 22 may synthesize the first synthesized signals A with the corrected time differences to generate at least one second synthesized signal. The second synthesizer 22 may output a second synthesized signal or a plurality of second synthesized signals, if needed.

According to an exemplary embodiment, as shown in FIGS. 2 and 9, the second synthesizer 22 may synthesize the first synthesized signals A using second weight values w2 to generate the second synthesized signal. The second weight values w2 may be applied to at least one of the first synthesized signals A to enhance, weaken, or remove a specific first synthesized signal A of the first synthesized signals A. The second weight values w2 may be determined depending on the first synthesized signals A synthesized by the second synthesizer 22. The second weight values w2 may be determined by the second weight processor 23. The second weight processor 23 may receive, as shown in FIGS. 2 and 9, the first synthesized signals A, and determine the second weight values w2 based on the received first synthesized signals A. Accordingly, the second weight values w2 may vary depending on the first synthesized signals A. The second weight processor 23 may transfer the second weight values w2 to the second synthesizer 22.

According to an exemplary embodiment, the second weight processor 23 may search for weight values that are suitable for the first synthesized signals A, in a second weight database 24, and determine the found weight values as second weight values w2. According to another exemplary embodiment, the second weight processor 23 may read a predetermined weight calculation method from the second weight database 24, and apply the predetermined weight calculation method to the received first synthesized signals A (including the eleventh, twelfth, and thirteenth synthesized signals), thereby determining second weight values w2.

According to an exemplary embodiment, the second weight processor 23 may calculate delay errors of the first synthesized signals A output from the first beamformer 10, and determine weight values that are proportional to the inverse values of the delay errors, as second weight values w2.

Figure 10:
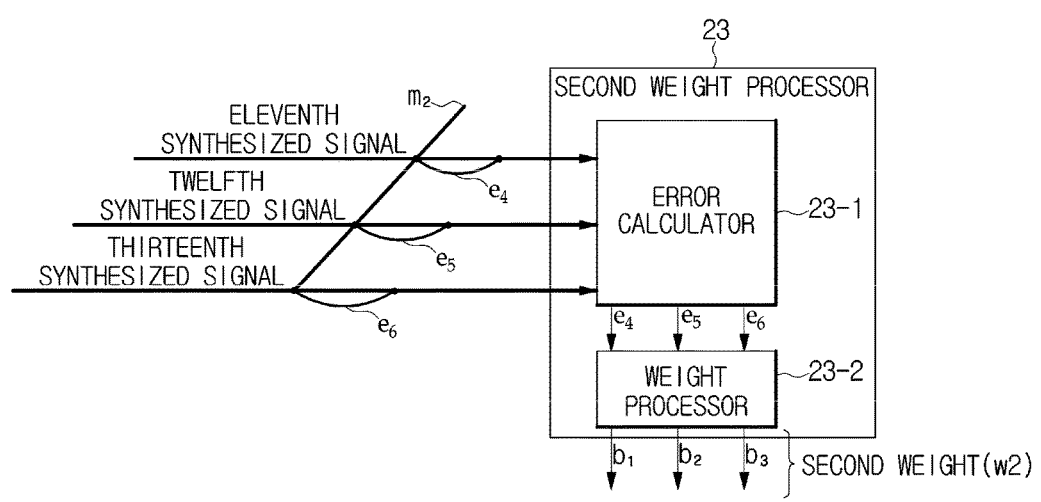
FIG. 10 is a control block diagram of a second weight processor according to an exemplary embodiment.

FIG. 10 is a control block diagram of the second weight processor 23 according to an exemplary embodiment.

Referring to FIG. 10, the second weight processor 23 may include an error calculator 23-1 to calculate delay errors of the first synthesized signals A, and a weight calculator 23-2 to determine weight values $b_1$ to $b_3$ of the first synthesized signals A.

For example, the eleventh to thirteenth synthesized signals may include delay errors $e_4$ to $e_6$ with respect to the target gradient $m_2$. The delay errors $e_4$ to $e_6$ may be time differences between the first synthesized signals A that are to be corrected by the second time difference corrector 21.

The target gradient $m_2$ may be a variable to finally determine a direction of received ultrasonic waves, and the target gradient $m_2$ may be equal to the gradient $m_1$ of the signals S1' to S3' of the first group with the corrected time differences to the signals S7' to S9' of the third group with the corrected time differences.

The error calculator 23-1 may calculate the delay errors $e_4$ to $e_6$ of the first synthesized signals A, and output the calculated delay errors $e_4$ to $e_6$ to the weight calculator 23-2.

The weight calculator 23-2 may determine second weight values $b_1$ to $b_3$ for the first synthesized signals A, based on the delay errors $e_4$ to $e_6$ received from the error calculator 23-1. More specifically, the weight calculator 23-2 may determine second weight values $b_1$ to $b_3$ that are inverse-proportional to the delay errors $e_4$ to $e_6$. The weight calculator 23-2 may apply the inverse values of the errors $e_4$ to $e_6$, as the second weight values $b_1$ to $b_3$, to the first synthesized signals A (that is, the eleventh to thirteenth synthesized signals). Referring to FIG. 10, since the eleventh synthesized signal includes an error $e_4$, the weight calculator 23-2 may apply the second weight value $b_1$ of $1/e_4$ to the eleventh synthesized signal. Likewise, the weight calculator 23-2 may apply the second weight value $b_2$ of $1/e_5$ to the twelfth synthesized signal, and the second weight value $b_3$ of $1/e_6$ to the thirteenth synthesized signal.

FIG. 11 shows graphs showing the results of applying a weight by the second weight processor 23.

Referring to FIG. 11, the signals S1' to S3' of the first group with the corrected time differences, the signals S4' to S6' of the second group with the corrected time differences, and the signals S7' to S9' of the third group with the corrected time differences may form a delay pattern with the gradient $m_1$, and the first synthesized signals A (that is, the eleventh to thirteenth synthesized signals) synthesized based on the delay pattern may form a delay pattern with the gradient $m_2$. In an exemplary embodiment, $m_2$ may be equal to $m_1$. The first synthesized signals A as denoted by a dotted line 1100 in FIG. 11 may be output from the first synthesizer 12, and may have delay errors with respect to target first synthesized signals forming the delay pattern with the gradient $m_2$, due to various factors.

The second weight processor 23 may calculate delay errors between the first synthesized signals A as shown by the dotted line 1100 and the target first synthesized signals forming the delay pattern with the gradient $m_2$, apply smaller weight values to the synthesized signals A with the greater delay errors, and apply greater weight values to the synthesized signals A with the smaller delay errors.

For example, if the delay error $e_4$ of the eleventh synthesized signal is greater than the delay error $e_5$ of the twelfth synthesized signal, the weight value $b_1$ that is applied to the eleventh synthesized signal may be smaller than the weight value $b_2$ that is applied to the twelfth synthesized signal.

Also, the second weight processor 23 according to another exemplary embodiment may apply weight values to the first synthesized signals A, and calculate a sum of the absolute values of the first synthesized signals A to which the weight values have been applied, or a sum of the absolute square values of the first synthesized signals A to which the weight values have been applied. Next, the second weight processor 23 may calculate weight values capable of minimizing the sum of the absolute values of the first synthesized signals A to which the weight values have been applied or the sum of the absolute square values of the first synthesized signals A to which the weight values have been applied, determine the calculated weight values as second weights w2, and transfer the second weights w2 to the second synthesizer 22.

The beamforming process that is performed by the second beamformer 20, as described above, may be expressed as Equation (3) below.

$$y_k(t) = \sum_{j=1}^{N} b_j z_j(t - \Delta_{jk}(t)) \quad (3)$$

In Equation (3), $y_k(t)$ is the second synthesized signal, j is an index to identify each first synthesized signal, and N is the number of the first synthesized signals input to the second beamformer 20. Since the number of the first synthesized signals A is equal to the number of the plurality of signal groups, N may be equal to J of Equation (1).

In Equation (3), $b_j$, is a second weight value that is applied to each first synthesized signal A, $\Delta_{jk}(t)$ is a time difference correction value that is used for time difference correction by the second time difference corrector 21, and $z_j(t-\Delta_{jk}(t))$ is a first synthesized signal A whose time difference has been corrected by the second time difference corrector 21.

As a result, the second synthesized signal may be calculated by Equation (4) based on Equations (1) and (3), as follows.

$$y_k(t) = \sum_{j=1}^{N} b_j \sum_{i=1}^{K_j} a_i x_i(t - \Delta_{ijk}(t)) \quad (4)$$

In Equation (4), $\Delta_{ijk}(t)$ is a time difference correction value when an input signal has passed through both the first beamformer 10 and the second beamformer 20.

According to an exemplary embodiment, as shown in FIG. 2, the second synthesized signal may be transferred to the image processor 34 or the signal processor 35.

The image processor 34 may produce an image corresponding to the second synthesized signal. The signal processor 35 may perform various signal processing, such as filtering, demodulation, and decompression, on the second synthesized signal, and transfer the signal-processed signal to the image processor 34. The image processor 34 may produce an image corresponding to the signal-processed signal.

If the second synthesizer 22 of the second beamformer 20 outputs a plurality of second synthesized signals, the beamforming apparatus may further include a third beamformer (not shown) to synthesize the plurality of second synthesized signals. The third beamformer may synthesize a plurality of synthesized signals through the same or similar procedure as the first beamformer 10 or the second beamformer 20 to thereby output a third synthesized signal.

The beamforming apparatus as described above may be implemented using a semiconductor chip capable of performing a function of computation or storage and a printed circuit board (PCB) on which the semiconductor chip is mounted. Also, the beamforming apparatus as described above may be applied to various kinds of equipment that performs a beamforming process. Various kinds of equipment that performs a beamforming process may include an ultrasonic imaging apparatus, a radar apparatus, or an antenna.

Figure 12:
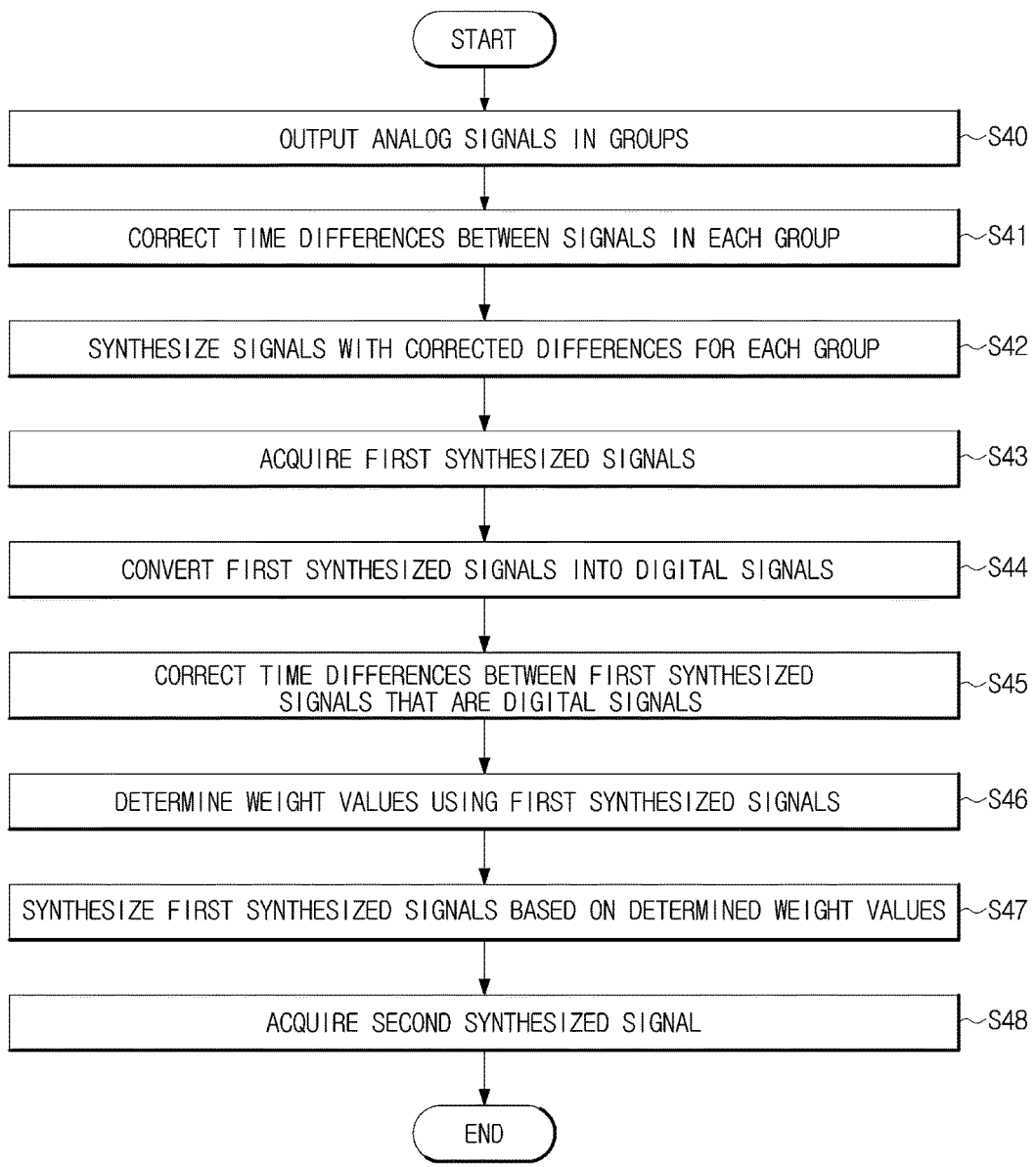
FIG. 12 is a flowchart illustrating a beamforming method according to an exemplary embodiment.

Hereinafter, a beamforming method according to an exemplary embodiment will be described with reference to FIG. 12. FIG. 12 is a flowchart illustrating a beamforming method according to an exemplary embodiment.

As shown in FIG. 12, signals of a plurality of groups may be output, in operation S40. Each group may include a plurality of signals. The output signals may be analog signals.

The first beamformer 10 (see FIG. 4) may correct time differences between signals included in each group, in operation S41.

According to an exemplary embodiment, the first beamformer 10 may correct time differences between one or more signals included in each group such that the signals form a delay pattern with a predetermined gradient $m_1$ (that is, a target gradient $m_1$). Each of the groups may be output with a delay pattern with the same gradient $m_1$.

After correcting the time differences between the signals of each group, the first beamformer 10 may synthesize the signals with the corrected differences, in operation S42. The first beamformer 10 may synthesize the signals for each group. According to an exemplary embodiment, the first beamformer 10 may synthesize the signals after applying predetermined weight values w1 to the signals. The predetermined weight values w1 may be acquired based on the signals of each group, or may be defined regardless of the signals of each group.

According to an exemplary embodiment, the predetermined weight values w1 may be determined as values that are inverse-proportional to errors of the signals with the corrected time differences. The errors may be errors between the signals with the corrected time differences of each group and the target gradient $m_1$, and a signal with a corrected time difference, having a greater error, may be assigned to a smaller weight value w1. The weight values w1 may be applied to the signals when the signals are synthesized.

As a result, a plurality of first synthesized signals A corresponding to each group may be acquired, in operation S43. If the signals of the plurality of groups are analog signals, the first synthesized signals A may also be analog signals. In this case, the analog-to-digital converters 31 to 33 (see FIG. 4) may convert the first synthesized signals A that are analog signals into digital signals to acquire a plurality of first synthesized signals A, in operation S44.

The second beamformer 20 may receive the plurality of first synthesized signals A that are digital signals, and correct time differences between the plurality of first synthesized signals A, in operation S45. The second weight processor 23 (see FIG. 9) may determine weight values w2 that are used by the second beamformer 20, using the first synthesized signals A that are digital signals, in operation S46.

According to an exemplary embodiment, the second weight processor 23 may calculate delay errors between the first synthesized signals A output from the first beamformer 10 and target first synthesized signals with the gradient $m_2$, and determine weight values w2 that are proportional to the inverse values of the delay errors.

The second beamformer 20 may apply the determined weight values w2 to the plurality of first synthesized signals that are digital signals to synthesize the plurality of first synthesized signals A, in operation S47, thereby acquiring at least one second synthesized signal, in operation S48. The second synthesized signal may be transferred to the image processor 34 (see FIG. 2), the signal processor 35 (see FIG. 2), or a third beamformer (not shown).

Hereinafter, an ultrasonic imaging apparatus to which the beamforming apparatus described above is applied, according to an exemplary embodiment, will be described with reference to FIGS. 13 to 19.

An ultrasonic imaging apparatus is equipment to collect ultrasonic waves transferred from the inside of an object and to acquire a sectional image (for example, a sectional image of a soft tissue or an image of a blood flow) about the internal tissue or structure of the object based on information of the collected ultrasonic waves. Hereinafter, as an example of the ultrasonic imaging apparatus to which the beamforming apparatus according to an exemplary embodiment is applied, an ultrasonic imaging apparatus that irradiates ultrasonic waves to an object and receive the irradiated ultrasonic waves to produce an ultrasound image will be described. However, the exemplary embodiments are not limited to the ultrasonic imaging apparatus which will be described below. For example, the ultrasonic imaging apparatus to which the beamforming apparatus according to an exemplary embodiment is applied may be a photoacoustic imaging apparatus, vibroacoustograpy, or picosecond ultrasonics. However, the exemplary embodiments may apply to any other apparatus capable of receiving ultrasonic waves and producing an ultrasound image.

Figure 13:
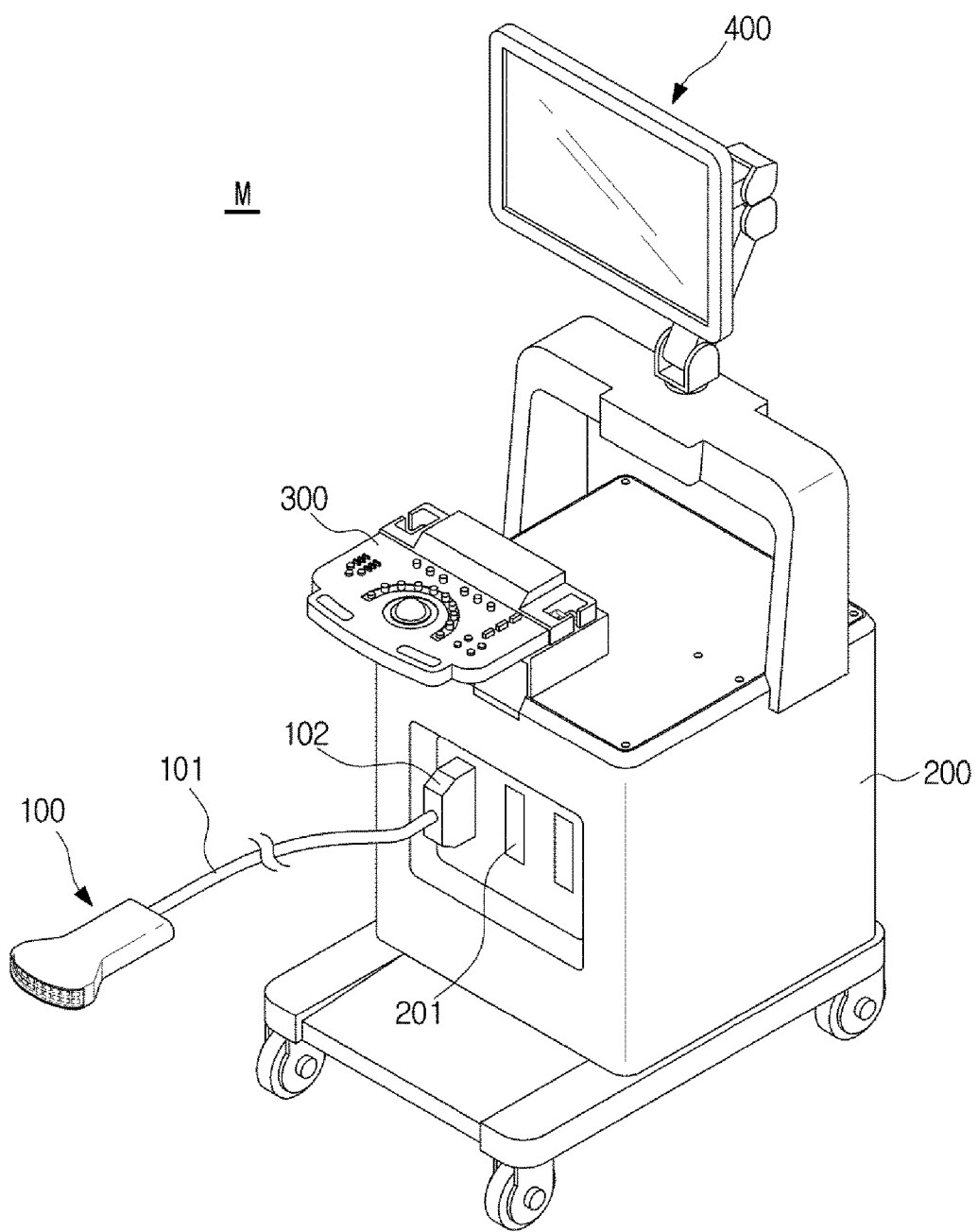
FIG. 13 is a perspective view of an ultrasonic imaging apparatus according to an exemplary embodiment.
Figure 14:
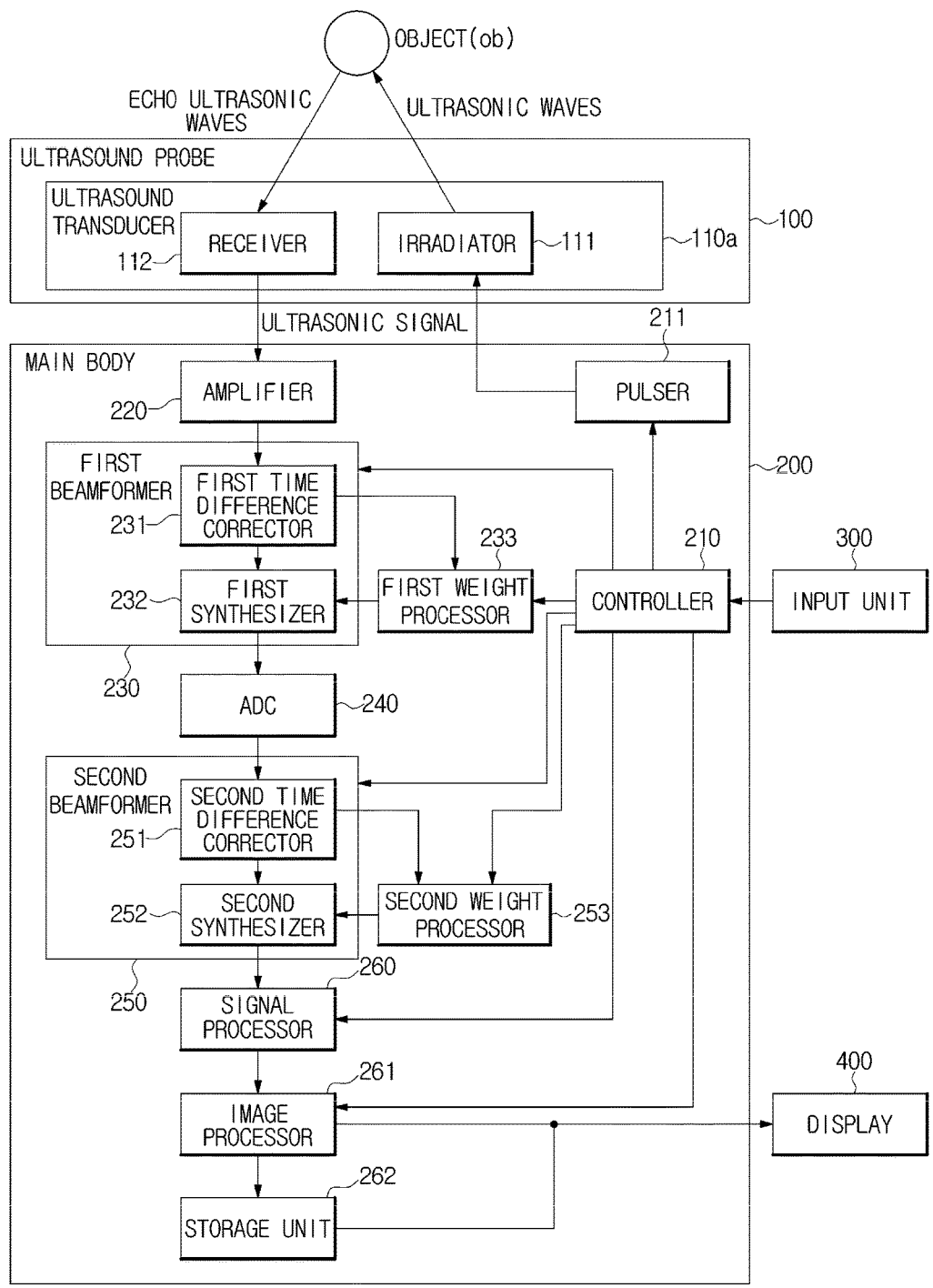
FIG. 14 is a block diagram of an ultrasonic imaging apparatus according to an exemplary embodiment.

FIG. 13 is a perspective view of an ultrasonic imaging apparatus according to an exemplary embodiment, and FIG. 14 is a block diagram of an ultrasonic imaging apparatus according to an exemplary embodiment. As shown in FIGS. 13 and 14, an ultrasonic imaging apparatus M may include an ultrasound probe 100, a main body 200, an input unit 300, and a display 400. The ultrasound probe 100, the main body 200, the input unit 300, and the display 400 may transmit data in a wired and/or wireless fashion. For example, as shown in FIG. 13, the ultrasound probe 100 may be connected to the main body 200 through a connection cable 101, wherein one end of the connection cable 101 may be connected to the ultrasonic probe 100, and the other end of the connection cable 101 may include a connector 102 that can be detachably coupled with a slot 201 of the main body 200. The ultrasound probe 100 and the main body 200 may transmit and/or receive commands or data to and/or from each other through the connection cable 101. According to an exemplary embodiment, the input unit 300 and the display 400 may be mounted on the main body 200, as shown in FIG. 13. According to another exemplary embodiment, the input unit 300 or the display 400 may be separated from the main body 200. For example, the input unit 300 or the display 400 may be mounted on a workstation (not shown) provided apart from the main body 200.

The ultrasound probe 100 may receive ultrasonic waves generated from the inside of an object ob, and convert the received ultrasonic waves into ultrasonic signals that are electronic signals. The ultrasound probe 100 may generate ultrasonic waves, and irradiate the ultrasonic waves to a target area in the object ob. According to an exemplary embodiment, the ultrasound probe 100 may generate and irradiate ultrasonic waves of a predetermined frequency based on a control signal from a controller 210 of the main body 200. According to another exemplary embodiment, the ultrasound probe 100 may generate and irradiate ultrasonic waves of a predetermined frequency based on a control signal from a controller installed in a housing of the ultrasound probe 100.

The ultrasound probe 100 may be, for example, at least one of a linear array probe, a convex array probe, a sector phased array probe, and a mechanical sector array probe.

The ultrasound probe 100 may include an ultrasound irradiator (or irradiator) 111 and an ultrasound receiver (or receiver) 112, as shown in FIG. 14. The ultrasound irradiator 111 may generate ultrasonic waves of a predetermined frequency according to an electrical voltage received from a pulser 211, and irradiate the generated ultrasonic waves to the target area of the object ob. The ultrasound receiver 112 may receive echo ultrasonic waves generated according to ultrasonic waves reflected from or irradiated to the target area, and generate ultrasonic signals that are electrical signals corresponding to the echo ultrasonic waves. According to an exemplary embodiment, the ultrasound probe 100 may include an ultrasound transceiver (not shown) that can perform both an ultrasound irradiation function and an ultrasound reception function. If the ultrasound probe 100 includes an ultrasound transceiver, the ultrasound probe 100 may further include a switch for switching between an ultrasound irradiation mode and an ultrasound reception mode. The ultrasound receiver 112 and the ultrasound transceiver may output ultrasonic signals of multiple channels. The ultrasound irradiator 111, the ultrasound receiver 112, and the ultrasound transceiver may each include one or more ultrasound transducers (see ultrasound transducers 110a of FIG. 16).

Figure 15:
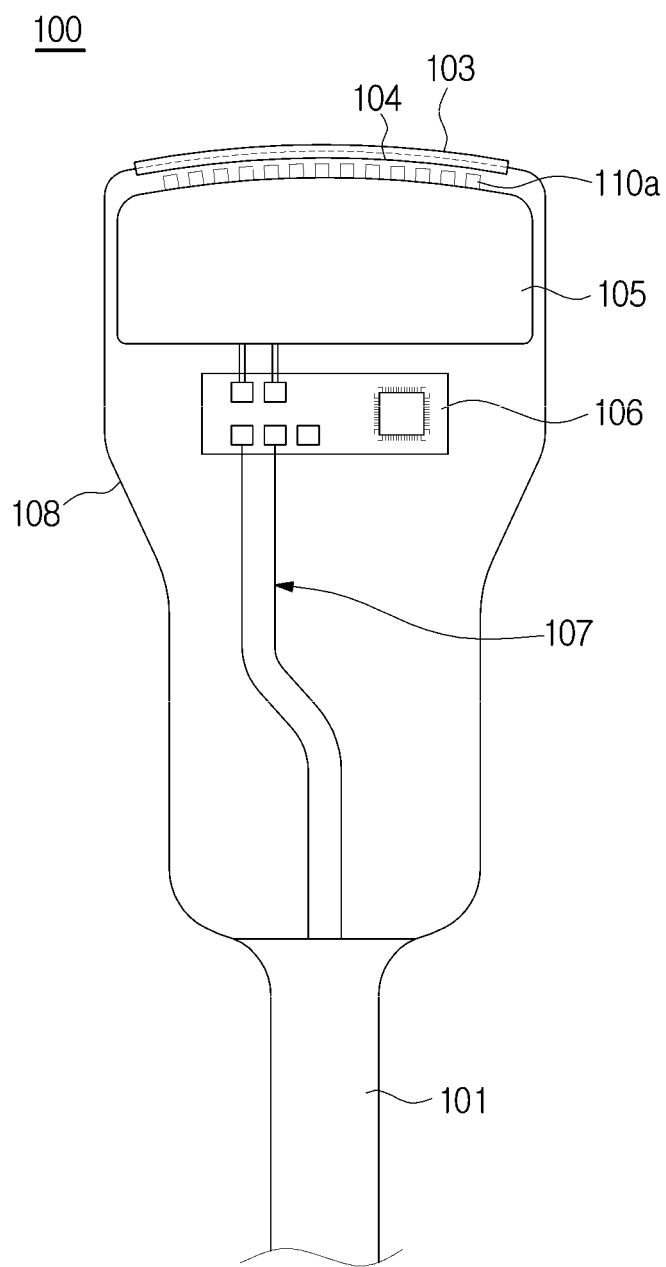
FIG. 15 is an exploded view of an ultrasound probe according to an exemplary embodiment.

FIG. 15 is an exploded view of the ultrasound probe 100 according to an exemplary embodiment. Referring to FIG. 15, the ultrasound probe 100 may include an acoustic lens 103, an acoustic matching layer 104, one or more ultrasound transducers 110a, an ultrasound transducer support 105, an ultrasound probe processor 106, and a lead wire 107.

The acoustic lens 103 may be designed to focus sound waves or ultrasonic waves or to cause the sound waves or ultrasonic waves to diverge. According to an exemplary embodiment, the acoustic lens 103 may refract ultrasonic waves generated by the ultrasound transducers 110a to focus the ultrasonic waves on a target area.

The acoustic matching layer 104 may provide a function of maintaining the straightness, waveform characteristics, and intensity of ultrasonic waves generated by the ultrasound transducers 110a or a function of minimizing reflection of the ultrasonic waves with respect to other media.

The ultrasound transducers 110a may convert electrical signals of a predetermined frequency into mechanical vibration of the same frequency to generate ultrasonic waves of the predetermined frequency. More specifically, if a voltage generated by the pulser 211 is applied to the ultrasound transducers 110a, piezoelectric vibrators or thin films of the ultrasonic transducers 110a may vibrate, and the ultrasound transducers 110a may generate a plurality of ultrasonic waves according to the vibration of the piezoelectric vibrators or the thin films. The ultrasonic waves generated by the ultrasound transducers 110a may be irradiated to the inside of the object ob, and focused on the target area in the object ob, as described above. The ultrasonic waves may be focused on a single target area to perform single focusing or on a plurality of target areas to perform multi-focusing.

Also, the ultrasound transducers 110a may receive ultrasonic waves, and vibrate at a frequency of the received ultrasonic waves according to the received ultrasonic waves to output ultrasonic signals that are electrical signals. Since each ultrasound transducer 110a can output a signal of a channel, a plurality of ultrasonic transducers 110a may output signals of a plurality of channels. The output ultrasonic signals may be transferred to an amplifier 220 or beamformers 230 and 250.

The ultrasound transducer 110a may be a piezoelectric ultrasonic transducer using the piezoelectric effect of a piezoelectric material, a magnetostrictive ultrasonic transducer using the magnetostrictive effect of a magnetic material, or a capacitive micromachined ultrasonic transducer (CMUT) using vibration of several hundreds or thousands of micromachined thin films. However, the ultrasound transducer may be any other type of an ultrasonic transducer capable of generating ultrasonic waves according to electrical signals or generating electrical signals according to ultrasonic waves.

Figure 16:
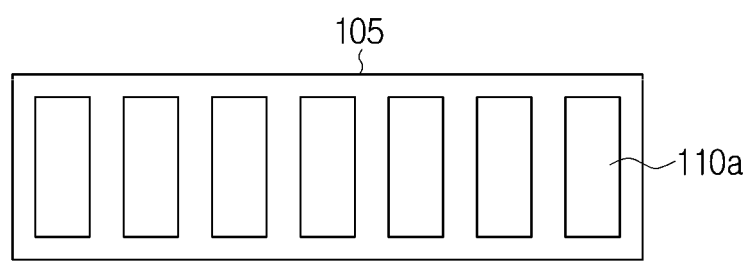
FIGS. 16 and 17 show arrangement of ultrasound transducers according to exemplary embodiments.
Figure 17:
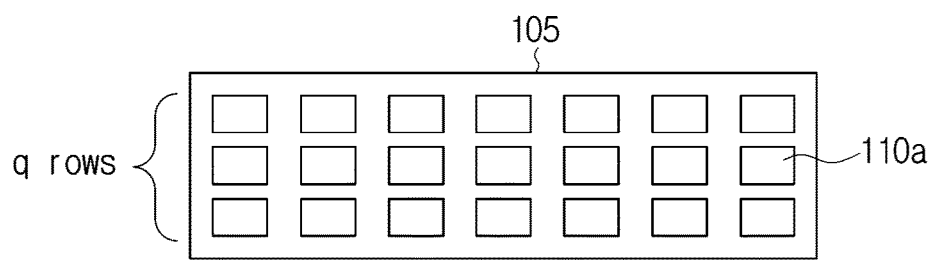

The ultrasound transducers 110a may be arranged on one side of the ultrasound transducer support 105. The ultrasound transducers 110a may be arranged in various arrays. FIGS. 16 and 17 show arrangement of the ultrasound transducers 110a according to exemplary embodiments. As shown in FIG. 16, the ultrasound transducers 110a may be arranged in a linear array on one side of the ultrasound transducer support 105. Also, as shown in FIG. 17, the ultrasound transducers 110a may be arranged in a plurality of rows (e.g., q rows) on one side of the ultrasound transducer support 105 (i.e., a two-dimensional (2D) array). According to an exemplary embodiment, the ultrasound transducers 110a may be arranged in two rows on one side of the ultrasound transducer support 105. If the ultrasound transducers 110a are arranged in a plurality of rows, it is possible to obtain high definition in a vertical direction.

The ultrasound transducer support 105 may absorb ultrasonic waves irradiated in an opposite direction among ultrasonic waves generated by the ultrasound transducers 110a, or emit heat generated during operation of the ultrasound transducers 110a, while supporting the ultrasound transducers 110a.

The ultrasound probe processor 106 may perform basic processing on ultrasonic signals, such as amplifying ultrasonic signals received from the ultrasound transducers 110a or converting analog ultrasonic signals into digital ultrasonic signals. According to an exemplary embodiment, the ultrasound probe processor 106 may perform a function of a first beamformer 130 included in the ultrasound probe 100 (see FIG. 19). According to another exemplary embodiment, the ultrasound probe processor 106 may perform functions of the first beamformer 130 and the second beamformer 250 included in the ultrasound probe 100 (see FIG. 19). Also, the ultrasound probe processor 106 may generate control signals for controlling overall operations of the ultrasound probe 100. The ultrasound probe processor 106 may be implemented using a semiconductor chip and/or a PCB. The semiconductor chip may include a memory semiconductor or a non-memory semiconductor. The ultrasound probe processor 106 may be installed on the rear or lateral part of the ultrasound transducer support 105. However, the ultrasound probe processor 106 may be installed at an arbitrary location in a housing 108 of the ultrasound probe 100, according to a designer's selection.

The lead wire 107 may function as a passage to transfer ultrasonic signals or beamformed ultrasonic signals to the main body 200. The lead wire 107 may be a part of the connection cable 101. Ultrasonic signals may be transferred to the main body 200 through the lead wire 107, the connector 102, and the slot 201 (see FIG. 13). According to an exemplary embodiment, beamformed ultrasonic signals may be transferred from the ultrasound probe 100 to the main body 200 through the lead wire 107, the connector 102, and the slot 201.

As shown in FIG. 14, the main body 200 may include the controller 210, the pulser 211, the amplifier 220, the first beamformer 230, an analog-to-digital converter (ADC) 240, the second beamformer 250, a signal processor 260, an image processor 261, and a storage unit 262. However, some of the aforementioned devices may be omitted if needed. Also, some of the aforementioned devices may be installed in the ultrasound probe 100 or in a workstation connected to the main body 200 through a wired and/or wireless communication network. The controller 210, the pulser 211, the amplifier 220, the first beamformer 230, the analog-to-digital converter 240, the second beamformer 250, the signal processor 260, and the image processor 261 may be implemented by at least one of processors (for example, a central processing unit (CPU) and/or a graphic processing unit (GPU)) installed in the ultrasound probe 100, the main body 200, or the workstation. The CPU and/or GPU may be implemented using a semiconductor chip and/or a PCB on which the semiconductor chip is mounted. The storage unit 262 may be implemented as a semiconductor memory device, a magnetic disk memory device, or an optical disk memory device, installed inside or outside the main body 200 or the workstation. When a command or data is transferred from a component 210 to 262 in the main body 200 to another component in the main body 200, the command or data may be temporarily or non-temporarily stored in a predetermined memory device for convenience of computation. The predetermined memory device may be a volatile memory device or a non-volatile memory device.

The controller 210 may control overall operations of the ultrasonic imaging apparatus according to commands from a user or according to predetermined settings. The command from the user may be input through the input unit 300. The predetermined settings may be stored in the storage unit 262. According to an exemplary embodiment, the controller 210 may generate a control command according to a frequency of ultrasonic waves that are to be irradiated, and transfer the control command to the pulser 211. The control command may include information about a frequency or magnitude of a voltage that is to be applied to the ultrasound irradiator 111.

The pulser 211 may generate a voltage for driving the ultrasound transducers 110a of the ultrasound irradiator 111. The pulser 211 may generate a voltage of a predetermined amplitude or a predetermined frequency according to a control command received from the controller 210. A frequency and intensity of ultrasonic waves that are generated by the ultrasound transducers 110a may depend on an amplitude and/or a frequency of a voltage generated by the pulser 211. The voltage output from the pulser 211 may be applied to the individual ultrasound transducers 110a of the ultrasound irradiator 111 at regular time intervals so that irradiated ultrasonic waves are focused or pointed.

The amplifier 220 may amplify voltages of ultrasonic signals of a plurality of channels output from the ultrasound receiver 112 to change the magnitudes of the voltages into magnitudes that can be appropriately processed by the first beamformer 230. A gain of the amplifier 220 may be set arbitrarily by a system designer or a user of the beamforming apparatus. According to an exemplary embodiment, the amplifier 220 may be installed in the ultrasound probe 100. However, the amplifier 220 may be omitted if needed. The ultrasonic signals amplified by the amplifier 220 may be transferred to the first beamformer 230. According to an exemplary embodiment, the ultrasonic signals amplified by the amplifier 220 may be transferred to an analog-to-digital converter (not shown) to convert analog ultrasonic signals into digital ultrasonic signals, and transferred to the first beamformer 210.

The ultrasonic signals of the plurality of channels output from the ultrasound receiver 112 or amplified by the amplifier 220 may be focused in two stages by the first beamformer 230 and the second beamformer 250. The ultrasonic signals of the plurality of channels may be grouped into one or more groups each including at least one of the ultrasonic signals of the plurality of channels. Each group may be a group of ultrasonic signals that are together synthesized by the first synthesizer 232 of the first beamformer 230. The groups may be disjoints or may share some elements (e.g., ultrasonic signals of some channels).

The first beamformer 230 may focus ultrasonic signals for each group to generate a plurality of first synthesized signals A. The first beamformer 230 may include a first time difference corrector 231 and a first synthesizer 232.

The first time difference corrector 231 may correct time differences between the ultrasonic signals of the plurality of channels. The first time difference corrector 231 may correct time differences between signals of the same group, and transfer the signals with the corrected time differences to the first synthesizer 232, as shown in FIGS. 5 and 6. As shown in FIG. 6, the first time difference corrector 231 may correct time differences between ultrasonic signals corresponding to the same group such that the ultrasonic signals form a delay pattern with the predetermined gradient $m_1$, without correcting time differences between ultrasonic signals corresponding to different groups.

The first synthesizer 232 may synthesize ultrasonic signals corresponding to the same group among the ultrasonic signals between which time differences have been corrected by the first time difference corrector 231, to generate a plurality of first synthesized signals A. According to an exemplary embodiment, the first synthesizer 232 may generate the plurality of first synthesized signals A without duplicatively using ultrasonic signals of each channel, as shown in FIG. 4. According to another exemplary embodiment, the first synthesizer 232 may generate the plurality of first synthesized signals A by duplicatively using ultrasonic signals of all or some channels, as shown in FIG. 7. The first synthesizer 232 may synthesize ultrasonic signals of multiple channels using first weight values transferred from a first weight processor 233, as shown in FIG. 14. The first weight values may have been set in advance regardless of ultrasonic signals, or may vary depending on ultrasonic signals. Also, the first weight processor 233 may apply weight values that are inverse-proportional to errors between gradients of the ultrasonic signals with the corrected time differences in the same group and a target gradient $m_1$, to the respective ultrasonic signals with the corrected time differences. The first synthesizer 232 may apply the first weight values to the ultrasonic signals of all channels or to the ultrasonic signals of some channels to synthesize the ultrasonic signals, as shown in FIG. 4. However, the first weight processor 233 may be omitted.

The beamforming process that is performed by the first beamformer 230 may be expressed as Equation (1) described above.

The analog-to-digital converter 240 may convert the first synthesized signals A output from the first beamformer 230 into digital signals.

The second beamformer 250 may synthesize the plurality of first synthesized signals A to generate a second synthesized signal. The second beamformer 250 may include a second time difference corrector 251 and a second synthesizer 252, as shown in FIG. 14.

The second time difference corrector 251 may correct time differences between the first synthesized signals A output from the first beamformer 230, as shown in FIG. 6. The first synthesized signals with the corrected time differences may be transferred to the second synthesizer 252.

The second synthesizer 252 may synthesize the plurality of first synthesized signals A with the corrected time differences to generate a second synthesized signal. The second synthesizer 252 may output a second synthesized signal or a plurality of second synthesized signals, if needed. The second synthesizer 252 may synthesize the first synthesized signals A using second weight values. The second weight values may be determined based on the first synthesized signals A, or may vary depending on the first synthesized signals A. The second weight values may be determined by a second weight processor 253. The second weight processor 253 may receive the first synthesized signals A, determine second weight values based on the first synthesized signals A, and transfer the determined second weight values to the second synthesizer 252, as shown in FIGS. 2, 12, and 14. Also, the second weight processor 253 may apply weight values that are inverse-proportional to delay errors between gradients of one or more first synthesized signals A and a target gradient $m_2$, to the respective first synthesized signals A. The second weight values may be determined by various methods, as described above with reference to FIG. 12.

The beamforming process that is performed by the second beamformer 250 may be expressed as Equation (3) described above.

As shown in FIG. 17, if the ultrasound transducers 110a are arranged in a plurality of rows, complexity of the ultrasonic imaging apparatus may increase depending on the number of the ultrasound transducers 110a. If a beamformer samples ultrasonic signals output from the ultrasound transducers 110a at a first frequency $4f_0$ that is four times higher than a center frequency $f_0$, definition of an ultrasound image may be degraded due to deterioration of delay resolution of the beamformer. If the beamformer samples ultrasonic signals at a second frequency $16f_0$ that is sixteen times higher than the center frequency $f_0$, definition of an ultrasound image may be improved, however, an amount of data to be processed may increase. If an amount of data increases, complexity of the ultrasonic imaging apparatus may increase in correspondence to the increased amount of data. Also, although the beamformer may improve picture quality using interpolation while sampling ultrasonic signals at the first frequency $4f_0$, an interpolator for performing the interpolation is needed, which increases the complexity of the ultrasonic imaging apparatus.

If the second beamformer 250 synthesizes the first synthesized signals A using second weight values that vary depending on the first synthesized signals A, it is possible to reduce a sampling frequency of the first beamformer 230 to the first frequency $4f_0$ that is 4 times higher than a center frequency $f_0$, without having to add an interpolator for increasing the accuracy of time difference correction. More specifically, by using second weight values varying depending on the first synthesized signals A, it is possible to reduce sidelobe energy that determines the definition of an ultrasound image and to reduce the bandwidth of ultrasonic signals that determine the resolution of an ultrasonic image, even upon sampling at the first frequency $4f_0$ that is four times higher than the center frequency $f_0$. Accordingly, the quality of an ultrasound image to be acquired may be improved. Therefore, even when time differences are corrected in an analog fashion, picture-quality deterioration due to low delay resolution may be prevented, and accordingly, an ultrasound image that can be acquired at the second frequency $16f_0$ that is sixteen times higher than the center frequency $f_0$ can be acquired through sampling at the first frequency $4f_0$, without increasing the complexity of the apparatus. In addition, since the sampling frequency of the first beamformer 230 can be reduced to a frequency $4f_0$ that is four times higher than the center frequency $f_0$, a smaller capacity memory can be used in the first beamformer 230. As a result, manufacturing costs of the ultrasonic imaging apparatus can be reduced.

The second synthesized signal output from the second beamformer 250 may be transferred to at least one of the signal processor 260 and the image processor 261.

The signal processor 260 may perform signal-processing on the second synthesized signal. For example, the signal processor 260 may perform a filtering process of applying a filter to the second synthesized signal to remove signals that are different from signals of a predetermined bandwidth. Also, the signal processor 260 may perform a detection process of converting a voltage of an ultrasonic signal from a radio frequency form to a video signal form. In addition, the signal processor 260 may perform a compression process of reducing differences in amplitude between ultrasonic signals. However, the signal processor 260 may be omitted if needed.

The image processor 261 may convert the second synthesized signal or the signal-processed signal output from the signal processor 260 into an image. The image processor 261 may produce an ultrasound image using scan conversion. The ultrasound image may be an Amplitude (A)-mode, Brightness (B)-mode, or Motion (M)-mode ultrasound image. The A-mode ultrasound image is an ultrasound image obtained by imaging an intensity of reflection as an amplitude based on a distance or signal arrival time between a target area and the ultrasound probe 100. The B-mode ultrasound image is an ultrasound image obtained by representing an intensity of ultrasonic waves using brightness. The M-mode ultrasound image is an ultrasound image obtained by imaging a change degree in motion of an object. The ultrasound image may include a Doppler image acquired using the Doppler effect. Also, the image processor 261 may correct the ultrasound image. The image processor 261 may correct the luminosity, brightness, sharpness, contrast, colors, etc. of the entire or a part of the ultrasound image so that a user can clearly see tissue in the ultrasound image. Also, the image processor 261 may remove noise or perform pixel interpolation. In addition, the image processor 261 may produce a panorama image or a three-dimensional (3D) ultrasound image using volume data. Such image processing may be performed according to an instruction from a user or according to predetermined settings.

The image processor 261 may store the produced or corrected ultrasound image in the storage unit 262, or may display the produced or corrected ultrasound image on the display 400.

The storage unit 262 may temporarily or non-temporarily store the ultrasound image produced by the image processor 261. If needed, the storage unit 262 may temporarily or non-temporarily store the first synthesized signals A, the second synthesized signal, or the second synthesized signal processed by the signal processor 260. The ultrasound image stored in the storage unit 262 may be displayed on the display 400 or transmitted to another storage unit (not shown), according to a user's requirement received through the input unit 300 or according to a command from the controller 210. If needed, the ultrasound image stored in the storage unit 262 may be transferred to a workstation connected to the ultrasonic imaging apparatus M. Also, the ultrasound image stored in the storage unit 262 may be transmitted to an external server through a wired and/or wireless network. The server may transmit the received ultrasound image to a terminal, for example, a desktop computer, a smart phone, a cellular phone, a tablet personal computer (PC), a notebook computer, or a personal digital assistance (PDA), through a wired and/or wireless network.

The input unit 300 may output an electrical signal according to a user's manipulation, and transfer the electrical signal to the controller 210. Accordingly, the controller 210 may receive various commands related to controlling of the ultrasonic imaging apparatus M from the user. The input unit 300 may include at least one of various input means, such as a keyboard, a mouse, a trackball, a touch screen, a touch pad, a paddle, various kinds of levers, a handle, and a joystick.

The display 400 may display the produced or corrected ultrasound image for the user. The display 400 may be a plasma display panel (PDP) display, a light emitting diode (LED) display, or a liquid crystal display (LCD). Also, the display 400 may be a 3D display that can display stereo images. The display 400 may include a touch screen. If the display 400 includes a touch screen, the display 400 may function as the input unit 300. The touch screen may be implemented using a resistive touch screen panel or a capacitive touch screen panel. Also, the touch screen may be implemented using a touch screen panel based on ultrasonic waves or infrared rays.

Figure 18:
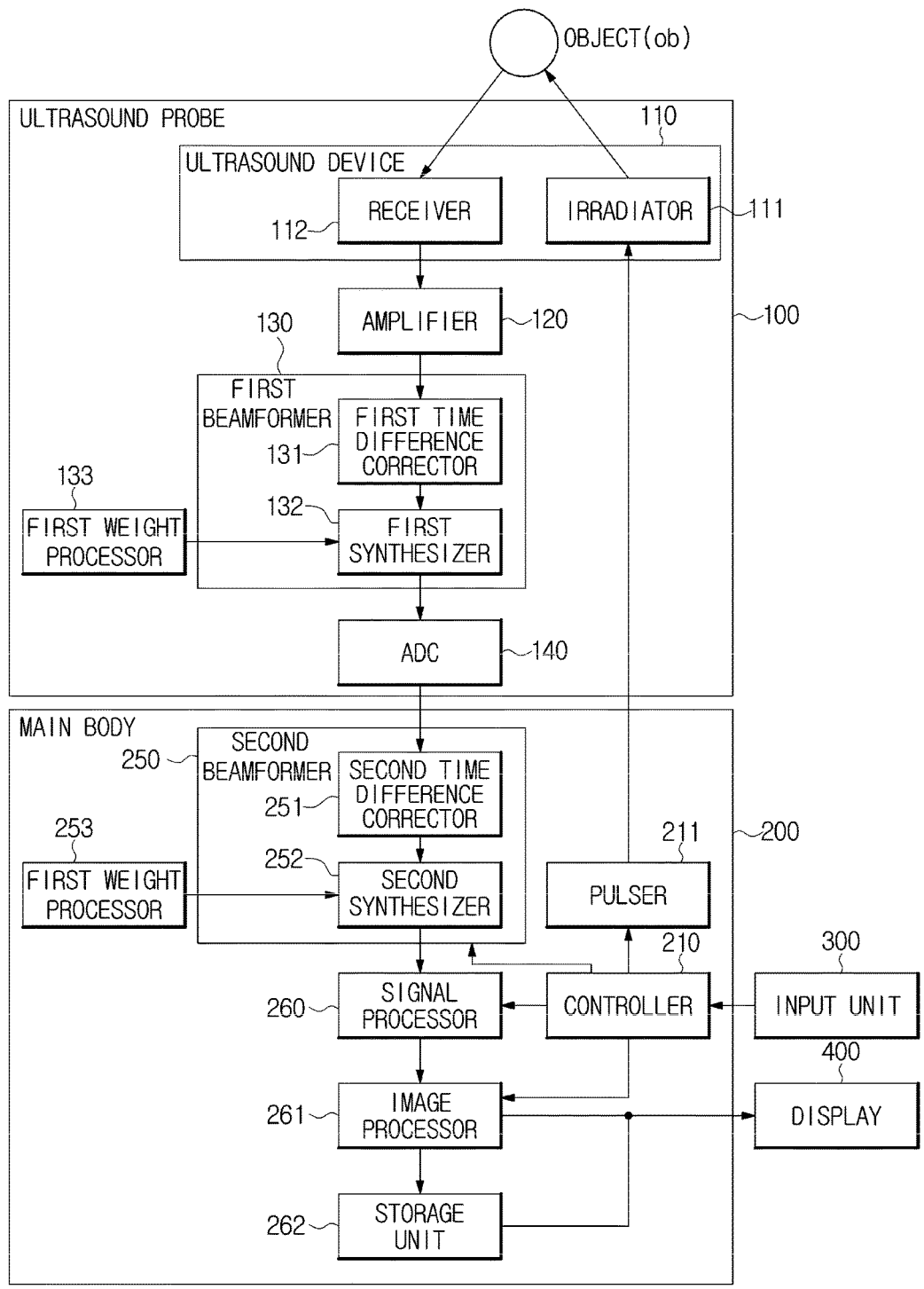
FIG. 18 is a block diagram of an ultrasonic imaging apparatus according to an exemplary embodiment.

FIG. 18 is a block diagram of an ultrasonic imaging apparatus according to another exemplary embodiment.

Referring to FIG. 18, an ultrasonic imaging apparatus may include an ultrasound probe 100 and a main body 200, and the ultrasound probe 100 may include an amplifier 120 and a first beamformer 130. The function of the amplifier 120 included in the ultrasound probe 100 may be the same as that of the amplifier 220 included in the main body 200 as described above. The first beamformer 130 of the ultrasound probe 100 may include a first time difference corrector 131 and a first synthesizer 132, as described above. The functions of the first beamformer 130, the first time difference corrector 131, and the first synthesizer 132 may be the same as those of the first beamformer 230, the first time difference corrector 231, and the first synthesizer 232 of the main body 200, as described above. If needed, the ultrasound probe 100 may further include a first weight processor 133 to calculate first weight values that are used by the first beamformer 130. Also, the ultrasound probe 100 may further include an analog-to-digital converter 140 to convert first synthesized signals A that are analog signals, into digital signals. The analog-to-digital converter 140 may be installed in the main body 200, instead of the ultrasound probe 100.

The main body 200 may include a second beamformer 250, a signal processor 260, an image processor 261, and a storage unit 262.

Figure 19:
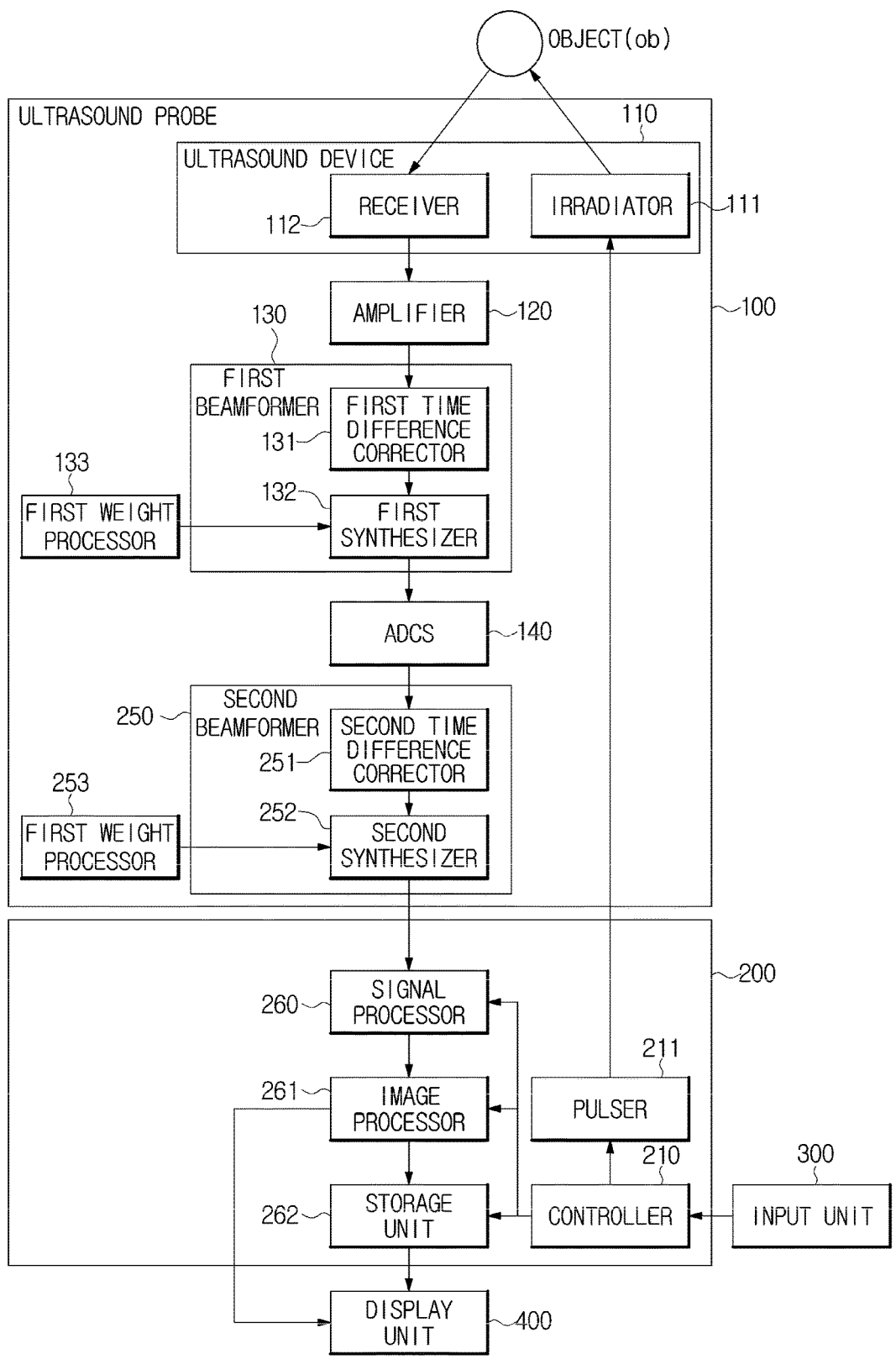
FIG. 19 is a block diagram of an ultrasonic imaging apparatus according to an exemplary embodiment.

FIG. 19 is a block diagram of an ultrasonic imaging apparatus according to still another exemplary embodiment.

Referring to FIG. 19, an ultrasonic imaging apparatus may include an ultrasound probe 100 and a main body 200, and the ultrasound probe 100 may include an amplifier 120, a first beamformer 130, a second beamformer 250, and a second weight processor 253. The function of the amplifier 120 of the ultrasound probe 100 may be the same as that of the amplifier 220 of the main body 200. The first beamformer 130 of the ultrasound probe 100 may include a first time difference corrector 131 and a first synthesizer 132, as described above, and the functions of the first beamformer 130, the first time difference corrector 131, and the first synthesizer 132 may be the same as those of the first beamformer 230, the first time difference corrector 231, and the first synthesizer 232 of the main body 200, as described above. If needed, the ultrasound probe 100 may further include a first weight processor 133 to calculate first weight values that are used by the first beamformer 130. The ultrasound probe 100 may further include an analog-to-digital converter 140 to convert the first synthesized signals A that are analog signals, into digital signals, and to transfer the digital ultrasonic signals to the second beamformer 250. The second beamformer 250 of the ultrasound probe 100 may also include a second time difference corrector 251 and a second synthesizer 252, and the functions of the second beamformer 250, the second time difference corrector 251, and the second synthesizer 252 may be the same as those of the second beamformer 250, the second time difference corrector 251, and the second synthesizer 252 of the main body 200, as described above. The second beamformer 250 of the ultrasound probe 100 may transfer a second synthesized signal to the main body 200 through the connection cable 101. The second weight processor 253 of the ultrasound probe 100 may determine second weight values that vary depending on the first synthesized signals A that are used by the second beamformer 250. The function of the second weight processor 253 of the ultrasound probe 100 may also be the same as that of the second weight processor 253 of the main body 200.

The main body 200 may include a signal processor 260, an image processor 261, and a storage unit 262. The signal processor 260 may receive ultrasonic signals from the second beamformer 250 of the ultrasound probe 100.

FIGS. 20A, 20B, 20C, 20D, and 20E are graphs showing delay degrees of signals by using the ultrasound transducers 110a, which are arranged in a plurality of rows and columns, as shown in FIG. 17.

Figure 20A:
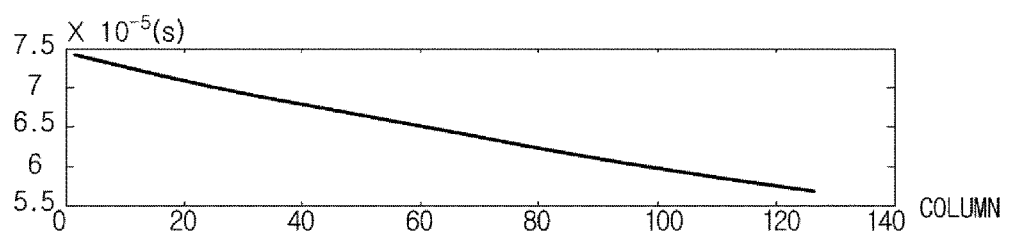
FIGS. 20A, 20B, 20C, 20D, and 20E are graph showing delay degrees of signals by using ultrasound transducers, which are arranged in a plurality of rows and columns, as shown in FIG. 17.
Figure 20B:
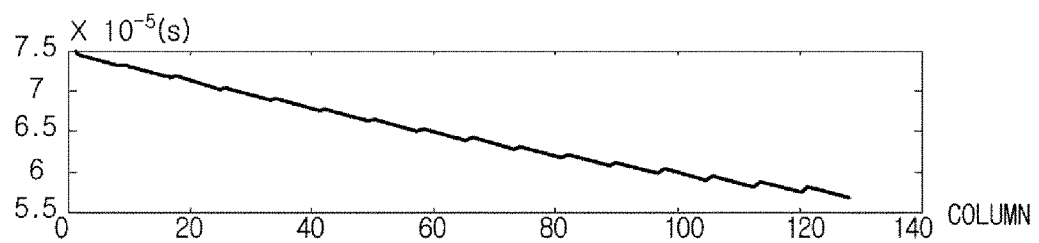
Figure 20C:
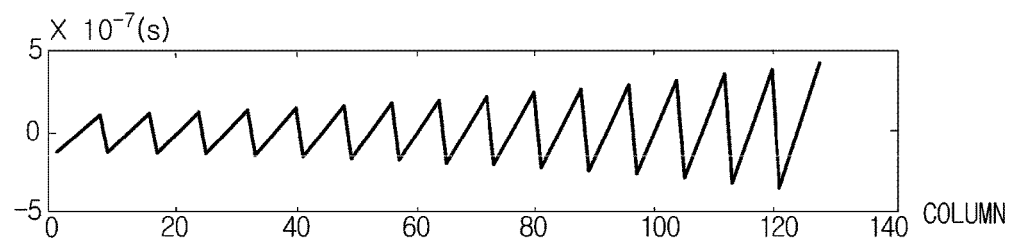

FIG. 20A shows a delay degree of an ideal second synthesized signal with a target gradient $m_2$, generated by transducers 110a including 64 rows and 128 columns, FIG. 20B shows a delay degree of a signal with a corrected time difference, the signal having a gradient $m_1$, and FIG. 20C shows errors between the ideal second synthesized signal shown in FIG. 20A and the signal with the corrected time difference, the signal having the gradient $m_1$.

Referring to FIG. 20B, by synthesizing the at least one signal with the corrected time difference, the signal having the gradient $m_1$, a signal close to the ideal second synthesized signal as shown in FIG. 20A may be generated. However, errors between the ideal second synthesized signal and the at least one signal with the corrected time difference increase in proportion to the displacement in the lateral direction of the ultrasound transducer 110a, as shown in FIG. 20C.

The signals with the corrected time differences for the individual transducers 110a including 64 rows and 128 columns may be synthesized by the first synthesizer 12, and input to channels of, for example, 8 rows and 16 columns, wherein each channel includes a first synthesized signal A.

Figure 20D:
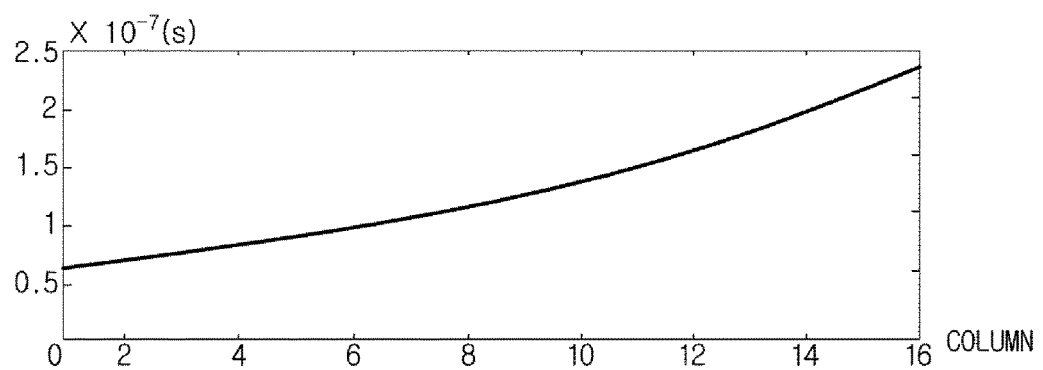
Figure 20E:
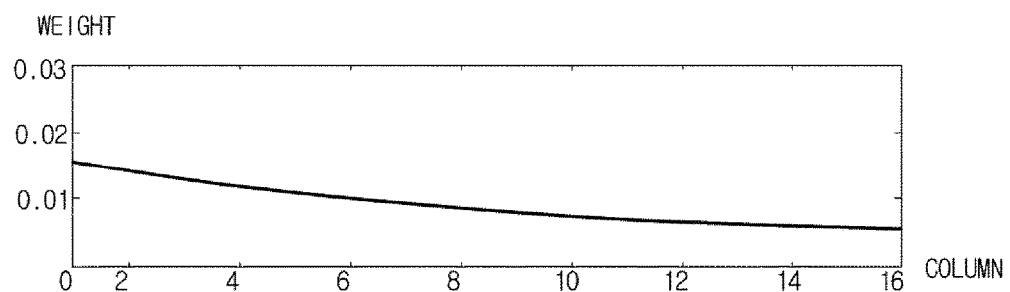

FIG. 20D shows a delay error of at least one first synthesized signal A that is input to any one row of channels including 8 rows and 16 columns, and FIG. 20E shows a weight value that is applied to the first synthesized signal A that is input to the corresponding row.

If the at least one signal with the corrected time difference as shown in FIG. 20B is synthesized by the first synthesizer 12, the errors as shown in FIG. 20C may be accumulated to generate a delay error as shown in FIG. 20D.

The beamforming apparatus and the ultrasonic imaging apparatus according to the exemplary embodiments may apply a weight value (see FIG. 20E) that is inverse-proportional to the delay error between the gradient of the first synthesized signal A and the target gradient $m_2$, to the first synthesized signal A, thereby generating a synthesized signal having minimum influence by the delay error. Hereinafter, a control method of an ultrasonic imaging apparatus, according to an exemplary embodiment, will be described with reference to FIGS. 21A and 21B.

Figure 21B:
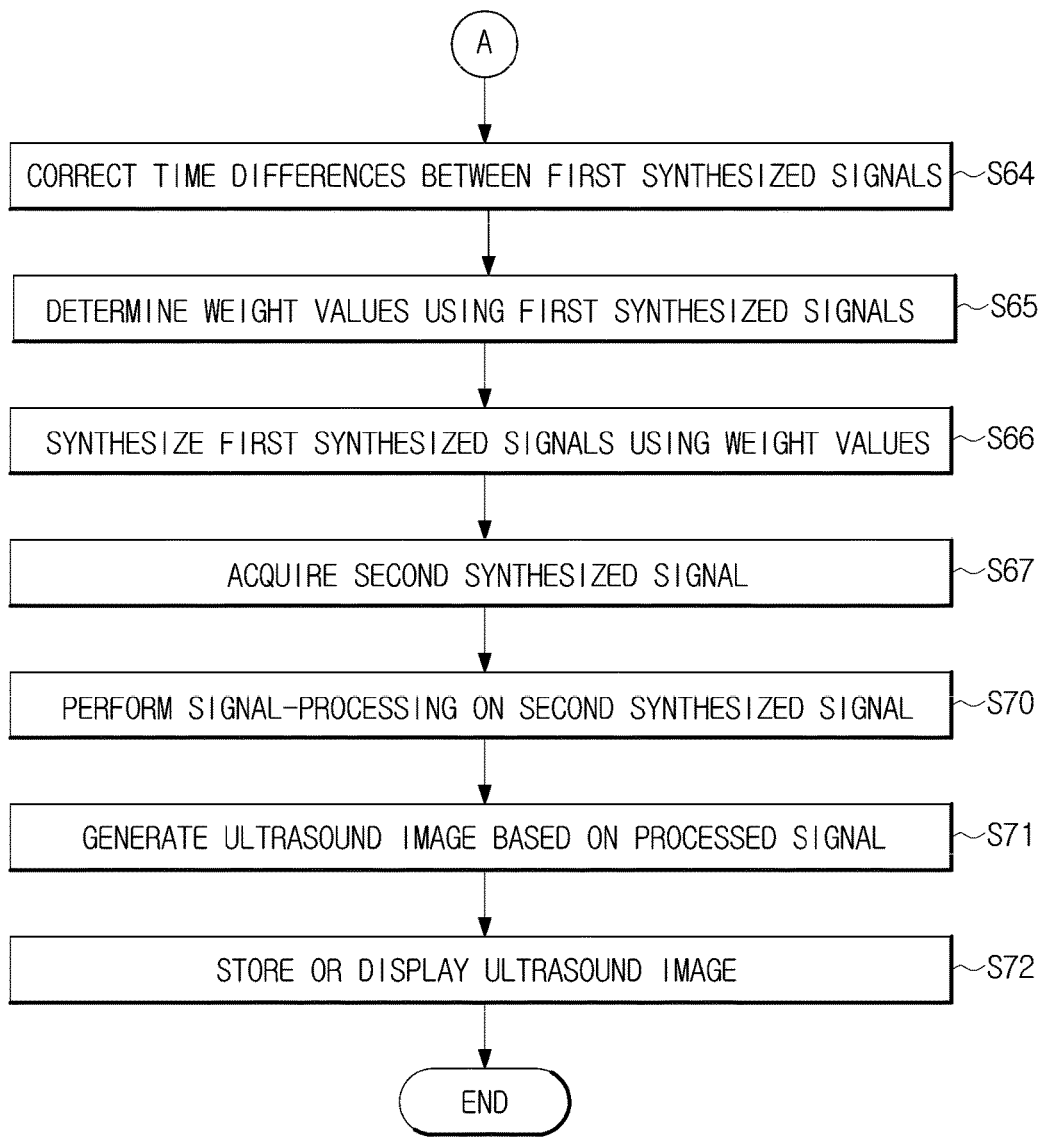

FIGS. 21A and 21B are flowcharts illustrating a control method of an ultrasonic imaging apparatus, according to an exemplary embodiment. Referring to FIGS. 14, 18, 19 and 21A, the controller 210 may generate a control command for producing an ultrasound image, according to a user's manipulation, and output the control command, in operation S50. The pulser 211 may generate a voltage of a predetermined frequency, in operation S51, and apply the generated voltage to the ultrasound transducers 110a (see FIG. 15) of the ultrasound probe 100. The ultrasound transducers 110a may generate ultrasonic waves corresponding to the applied voltage, and irradiate the ultrasonic waves to an object ob, in operation S52. The irradiated ultrasound waves may be reflected from a target area in the object ob. The ultrasound transducers 110a may receive the reflected echo ultrasound waves in operation S53, and convert the echo ultrasound waves into ultrasonic signals that are electrical signals in operation S54. The amplifier 120 or 220 may amplify the ultrasonic signals, and transfer the amplified signals to the first beamformer 130 or 230, in operation S55.

The first beamformer 130 or 230 may correct time differences between the ultrasonic signals, in operation S60. The first time difference corrector 131 or 231 of the first beamformer 130 or 230 may correct time differences between ultrasonic signals for each group such that ultrasonic signals belonging to the group form a delay pattern with a predetermined gradient $m_1$. Each group may be a group of ultrasonic signals that are together synthesized by the first synthesizer 132 or 232. The first synthesizer 132 or 232 of the first beamformer 130 or 230 may synthesize ultrasonic signals for each group, in operation S61, to acquire a plurality of first synthesized signals A, in operation S62. At this time, the first synthesizer 132 or 232 may synthesize the first synthesized signals A after applying predetermined weights w1 to the first synthesized signals A, wherein the weight values w1 may be determined as values that are inverse-proportional to errors of signals between which time differences have been corrected by the first weight processor 133 or 233. If needed, the analog-to-digital converter 140 or 240 may convert the plurality of first synthesized signals A into digital signals, in operation S63. The plurality of first synthesized signal A may be transferred to the second beamformer 250.

As shown in FIG. 21B, the second time difference corrector 251 of the second beamformer 250 may correct time differences of the plurality of first synthesized signals A, in operation S64. Thereafter, the second weight processor 253 may determine weight values using the plurality of first synthesized signals A with the corrected time differences, in operation S65. The second synthesizer 252 may synthesize the plurality of first synthesized signals A using the weight values to acquire a second synthesized signal, in operations S66 and S67. More specifically, the second weight processor 253 may calculate delay errors between the first synthesized signals A, and determine weight values that are inverse-proportional to the delay errors, as second weight values w2.

The signal processor 250 may perform various processing such as filtering on the second synthesized signal, in operation S70. Thereafter, the image processor 261 may produce an ultrasound image based on the processed signal, in operation S71. The ultrasound image may be stored in the storage unit 262 or displayed on the display 400, in operation S72. Operations S50 to S72 described above may be repeatedly performed during ultrasonography.

Therefore, according to the beamforming apparatus, the beamforming method, and the ultrasonic imaging apparatus as described above, since deterioration of picture quality can be minimized when a plurality of signals are focused, it is possible to acquire a beamformed image with high quality.

According to the beamforming apparatus, the beamforming method, and the ultrasonic imaging apparatus as described above, since an image with high quality can be acquired without sampling signals at a high sampling frequency for beamforming, it is possible to reduce an amount of data that is processed or transmitted in the apparatus.

According to the beamforming apparatus, the beamforming method, and the ultrasonic imaging apparatus as described above, since an amount of data that is processed or transmitted in the apparatus is reduced, it is possible to reduce a resource of the apparatus, for example, by reducing the capacity of memory needed for data processing or omitting some components.

According to the ultrasonic imaging apparatus as described above, since an interpolation function for reducing an amount of data that is transmitted or processed in the ultrasonic imaging apparatus is not needed, complexity in designing the apparatus can be improved, which leads to weight reduction and miniaturization of the apparatus.

In addition, according to the beamforming apparatus and the beamforming method described above, it is possible to reduce a manufacturing time and cost of an apparatus, such as an ultrasonic imaging apparatus or a radar apparatus, which performs a beamforming process.

The exemplary embodiment of the inventive concept may be implemented in the form of a storage medium that includes computer executable instructions, such as program modules, being executed by a computer. Computer-readable media may be any available media that may be accessed by the computer and includes volatile media such as a random access memory (RAM), nonvolatile media such as a read only memory (ROM), and removable and non-removable media. In addition, the computer-readable media may include computer storage media and communication media. Computer storage media includes the volatile media, non-volatile media, and removable and non-removable media implemented as any method or technology for storage of information such as computer readable instructions, data structures, program modules, or other data. The medium of communication is typically computer-readable instructions, and other data in a modulated data signal such as data structures, or program modules, or other transport mechanism and includes any information delivery media. Examples of the computer storage media include, for example, ROM, RAM, a flash memory, a compact disc (CD), a digital versatile disc (DVD), a magnetic disc, or a magnetic tape.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A beamforming apparatus comprising:
a signal output unit configured to output signals;
a time difference corrector configured to correct a time difference between the signals; and
a weight applier configured to obtain an error between the signals with the corrected time difference and a target delay pattern and apply a weight value to the signals based on the error,
wherein the time difference corrector is configured to correct the time difference so that the signals with the corrected time difference form a predetermined gradient of the target delay pattern.

2. The beamforming apparatus according to claim 1, wherein the signals are grouped into a plurality of groups.

3. The beamforming apparatus according to claim 2, wherein the time difference corrector is configured to correct the time difference between the signals such that signals of each group form a delay pattern.

4. The beamforming apparatus according to claim 1, wherein the weight applier is configured to synthesize the signals to which the weight value has been applied.

5. The beamforming apparatus according to claim 1, wherein the weight applier is configured to apply the weight value that is inverse-proportional to a value of the error, to the signals.

6. The beamforming apparatus according to claim 1, further comprising:
an analog-to-digital converter configured to convert the signals into digital signals.

7. The beamforming apparatus according to claim 1, wherein the weight applier comprises:
a weight processor configured to calculate the weight value according to the error between the signals with the corrected time difference and the target delay pattern; and a synthesizer configured to apply the calculated weight value to the signals, and configured to synthesize the signals to which the weight value is applied.

8. The beamforming apparatus according to claim 1, further comprising:
a first synthesizer configured to synthesize the signals with the corrected time difference to generate first synthesized signals,
wherein the weight applier comprises a second synthesizer configured to synthesize the first synthesized signals to which the weight value has been applied to generate a second synthesized signal.

9. The beamforming apparatus according to claim 1, further comprising:
a storage unit configured to store the target delay pattern.

10. A beamforming method comprising:
outputting signals;
correcting a time difference between the signals; and
obtaining an error between the signals with the corrected time difference and a target delay pattern and applying a weight value to the signals based on the error,
wherein the correcting of the time difference comprises correcting the time difference so that the signals with the corrected time difference form a predetermined gradient of the target delay pattern.

11. The beamforming method according to claim 10, wherein the signals are grouped into a plurality of groups.

12. The beamforming method according to claim 11, wherein the correcting comprises correcting the time difference between the signals such that signals of each group form a delay pattern.

13. The beamforming method according to claim 10, wherein the applying comprises synthesizing the signals to which the weight value has been applied.

14. The beamforming method according to claim 10, wherein the applying comprises applying the weight value that is inverse-proportional to a value of the error, to the signals.

15. The beamforming method according to claim 10, wherein the applying comprises:

calculating the weight value according to the error between the signals with the corrected time difference and the target delay pattern; and
applying the calculated weight value to the signals and synthesizing the signals to which the weight value is applied.

16. An ultrasonic imaging apparatus comprising:
an ultrasound transducer configured to receive ultrasonic waves, configured to convert the ultrasonic waves into electrical signals, and configured to output ultrasonic signals;
a first beamformer configured to synthesize the ultrasonic signals to generate first synthesized signals so that the first synthesized signals form a predetermined gradient of a target delay pattern; and
a second beamformer configured to obtain an error between the first synthesized signals and the target delay pattern, configured to apply a weight value to the first synthesized signals according to the error, configured to synthesize the first synthesized signals to which the weight value has been applied, and configured to generate a second synthesized signal.

17. The ultrasonic imaging apparatus according to claim 16, wherein the first beamformer comprises a first time difference corrector configured to correct a time difference between the ultrasonic signals.

18. The ultrasonic imaging apparatus according to claim 16, further comprising at least one of:
a converter configured to convert the first synthesized signals into digital signals;
a signal processor configured to perform processing on the second synthesized signal, and configured to output the processed signal, the processing comprising at least one of filtering, demodulation, and compression; and
an image processor configured to convert the processed signal into an ultrasound image, and configured to perform image processing on the ultrasound image.

* * * * *